United States Patent
Sato et al.

(10) Patent No.: US 8,440,748 B2
(45) Date of Patent: May 14, 2013

(54) THERMOPLASTIC RESIN COMPOSITION AND MOLDED ITEM FORMED FROM SAME

(75) Inventors: Daisuke Sato, Nagoya (JP); Yosuke Onoue, Nagoya (JP); Sadanori Kumazawa, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/582,905

(22) PCT Filed: Sep. 13, 2011

(86) PCT No.: PCT/JP2011/070861
§ 371 (c)(1),
(2), (4) Date: Sep. 5, 2012

(87) PCT Pub. No.: WO2012/043219
PCT Pub. Date: Apr. 5, 2012

(65) Prior Publication Data
US 2012/0329920 A1    Dec. 27, 2012

(30) Foreign Application Priority Data

Sep. 28, 2010  (JP) ................................. 2010-216644
May 31, 2011  (JP) ................................. 2011-121494

(51) Int. Cl.
  *C08K 5/3462*  (2006.01)
  *C08K 5/3492*  (2006.01)
  *C08K 3/20*    (2006.01)
  *C08K 3/32*    (2006.01)
  *C08K 5/51*    (2006.01)

(52) U.S. Cl.
  USPC ........................ 524/100; 524/140; 524/430

(58) Field of Classification Search .................. 524/100
  See application file for complete search history.

(56) References Cited

U.S. PATENT DOCUMENTS 7,910,643 B2 * 3/2011 Tobita et al. .................. 524/192
2010/0174017 A1 * 7/2010 Tobita et al. .................. 524/192

FOREIGN PATENT DOCUMENTS

| JP | 2001-503075 | | 3/2001 |
| JP | 2008-074879 | A | 4/2008 |
| JP | 2009-120717 | A | 6/2009 |
| JP | 2009-242803 | A | 10/2009 |
| JP | 2009-249532 | A | 10/2009 |
| WO | WO2005-080494 | A1 | 9/2005 |

OTHER PUBLICATIONS

International Search Report dated Dec. 13, 2011, application No. PCT/JP2011/070861.

* cited by examiner

*Primary Examiner* — Kriellion Sanders
(74) *Attorney, Agent, or Firm* — RatnerPrestia

(57) ABSTRACT

Provided is a thermoplastic resin composition comprising 1 to 100 parts by weight of a flame retardant (B) containing any one or more flame retardants (B-1) selected from melamine phosphate, melamine pyrophosphate, and melamine polyphosphate and any one or more flame retardants (B-2) selected from piperazine phosphate, piperazine pyrophosphate, and piperazine polyphosphate, based on 100 parts by weight of a thermoplastic resin (A) comprising polylactide resin, wherein, according to transmission electronic microscopy, the major axis of the largest particle of the flame retardant (B) in the composition is not more than 10 μm, and the ratio of the number of particles of the flame retardant (B) having a major axis of not more than 3 μm relative to the number of particles of the flame retardant (B) per an area of 1,000 μm² is 70% or more.

15 Claims, No Drawings

THERMOPLASTIC RESIN COMPOSITION AND MOLDED ITEM FORMED FROM SAME

CROSS REFERENCE TO RELATED APPLICATIONS

This application is the U.S. National Phase application of PCT International Application No. PCT/JP2011/070861, filed Sep. 13, 2011, and claims priority to Japanese Patent Application Nos. 2010-216644, filed Sep. 28, 2010, and 2011-121494, filed May 31, 2011, the disclosures of each of these applications being incorporated herein by reference in their entireties for all purposes.

FIELD OF THE INVENTION

The present invention relates to a thermoplastic resin composition having excellent molding processability, shock resistance, and heat resistance, in particular, excellent flame retardancy, and a molded article made of the same.

BACKGROUND OF THE INVENTION

Polylactic acid resin is expected as a practically excellent biodegradable polymer because it has a high melting point and is melt-moldable. It is a thermoplastic resin with low environmental load that is also expected to be used as a general-purpose polymer prepared from biomass materials in the future and has been increasingly used as a molded article by molding such as injection molding and extrusion molding. However, in application of a polylactic acid resin, for example, to electrical and electronic equipment parts and office automation equipment parts, it has been necessary to highly improve particularly flame retardancy as well as molding processability, shock resistance, and heat resistance.

For example, Patent Document 1 discloses, as a method for improving the flame retardancy of a thermoplastic resin, the invention that highly improves flame retardancy by adding a phosphate compound and a phosphate ester compound with a particular structure to a synthetic resin. Patent Document 2 discloses a flame retardant composition obtained by adding silicone oil with a particular viscosity to a flame retardant composition composed of a salt of piperazine and an inorganic phosphorus compound and a salt of melamine and an inorganic phosphorus compound and a flame retardant polyolefin resin composition. Further, Patent Document 3 discloses a flame retardant composition obtained by adding silicone oil, a monoamide compound, and/or a monoester compound to a flame retardant composition composed of a salt of piperazine and an inorganic phosphorus compound and a salt of melamine and an inorganic phosphorus compound and a flame retardant synthetic resin composition. Patent Document 4 discloses a polylactic acid resin composition containing a polylactic acid resin, a particular plasticizer, a particular crystal nucleating agent, and a phosphorus flame retardant other than phenyl phosphonic acid metal salt and discloses phosphate and condensed phosphate as a phosphorus flame retardant.

PATENT DOCUMENTS

Patent Document 1: JP 2009-242803 A (pp. 1-4, Examples)
Patent Document 2: WO 2005/080494 (pp. 1-2, Examples)
Patent Document 3: JP 2009-120717 A (pp. 1-2, Examples)
Patent Document 4: JP 2009-249532 A (pp. 1-2, Examples)

SUMMARY OF THE INVENTION

When the invention according to Patent Documents 1 to 3 is applied to a polylactic acid resin, there have been problems in that the effect of improving the flame retardancy of the polylactic acid resin is not sufficient and also that it is difficult to sufficiently improve molding processability, shock resistance, and heat resistance.

Further, the invention of Patent Document 4 has such a problem that it is difficult to highly improve the flame retardancy of a polylactic acid resin.

The present invention improves the molding processability, shock resistance, and heat resistance of a thermoplastic resin comprising polylactide resin, which have been problems in the prior art as mentioned above, and besides provides a thermoplastic resin composition having, in particular, excellent flame retardancy and a molded article made of the same.

The present inventors intensively studied to solve the above-described problems, and consequently solved the above-described problems by adding a flame retardant having a particular structure to a thermoplastic resin comprising polylactide resin and further controlling the largest particle diameter of the flame retardant in the thermoplastic resin composition and the ratio of the number of particles having a particular particle diameter of the flame retardant, thereby completing the present invention.

Thus the problems of the present invention can be solved by a thermoplastic resin composition comprising 1 to 100 parts by weight of a flame retardant (B) containing any one or more flame retardants (B-1) selected from melamine phosphate, melamine pyrophosphate, and melamine polyphosphate and any one or more flame retardants (B-2) selected from piperazine phosphate, piperazine pyrophosphate, and piperazine polyphosphate, based on 100 parts by weight of a thermoplastic resin (A) comprising polylactide resin, wherein, according to transmission electronic microscopy, the major axis of the largest particle of the flame retardant (B) in the resin composition is not more than 10 μm, and the ratio of the number of particles of the flame retardant (B) having a major axis of not more than 3 μm relative to the number of particles of the flame retardant (B) per an area of 1,000 μm$^2$ is 70% or more.

Further, the problems of the present invention can be solved by a molded article obtained by molding the thermoplastic resin composition described above.

The thermoplastic resin composition of the present invention preferably further comprises 1 to 50 parts by weight of a condensed phosphate ester (H) based on 100 parts by weight of the thermoplastic resin comprising polylactide resin (A).

In the thermoplastic resin composition of the present invention, the blending ratio of the flame retardant (B) to the condensed phosphate ester (H) (the ratio of the flame retardant (B)/the condensed phosphate ester (H)) is preferably 90/10 to 60/40 in weight ratio.

The thermoplastic resin composition of the present invention preferably further comprises 0.01 to 50 parts by weight of a crystal nucleating agent (C) based on 100 parts by weight of the thermoplastic resin comprising polylactide resin (A).

The thermoplastic resin composition of the present invention preferably further comprises 0.01 to 10 parts by weight of a fluorine-based resin (D) based on 100 parts by weight of the thermoplastic resin comprising polylactide resin (A).

The thermoplastic resin composition of the present invention preferably further comprises 0.01 to 10 parts by weight of a metal oxide (E) based on 100 parts by weight of the thermoplastic resin comprising polylactide resin (A).

The thermoplastic resin composition of the present invention preferably further comprises 0.1 to 50 parts by weight of a plasticizer (F) based on 100 parts by weight of the thermoplastic resin comprising polylactide resin (A).

The thermoplastic resin composition of the present invention preferably further comprises 0.1 to 50 parts by weight of an impact modifier (G) based on 100 parts by weight of the thermoplastic resin comprising polylactide resin (A).

In the thermoplastic resin composition of the present invention, the thermoplastic resin comprising polylactide resin (A) preferably comprises 1 to 99% by weight of a polylactide resin (A-1) and 99 to 1% by weight of a thermoplastic resin other than polylactide resin (A-2).

In the thermoplastic resin composition of the present invention, the thermoplastic resin other than polylactide resin (A-2) is preferably a polycarbonate resin.

In the thermoplastic resin composition of the present invention, the flame retardant (B-1) is preferably melamine pyrophosphate.

In the thermoplastic resin composition of the present invention, the flame retardant (B-2) is preferably piperazine pyrophosphate.

In the thermoplastic resin composition of the present invention, the impact modifier (G) is preferably a core-shell type rubber (G-1).

In the thermoplastic resin composition of the present invention, the core-shell type rubber (G-1) preferably contains a glycidyl group(s).

The present invention provides a thermoplastic resin composition having excellent molding processability, heat resistance, and shock resistance, in particular, excellent flame retardancy, and a molded article made of the same, and the molded article made of the thermoplastic resin composition of the present invention can be used effectively in various applications such as automotive parts, electrical and electronic equipment parts, office automation equipment parts, building components, and daily necessities by utilizing the above-described properties.

DETAILED DESCRIPTION OF EMBODIMENTS OF THE INVENTION

The present invention will now be described in detail with reference to exemplary embodiments.

The thermoplastic resin comprising polylactide resin (A) in an exemplary embodiment of the present invention comprises the polylactide resin (A-1) and may comprise the thermoplastic resin other than polylactide resin (A-2). The polylactide resin (A-1) as used herein refers to a polymer mainly composed of L-lactic acid and/or D-lactic acid and may comprise other copolymer components other than lactic acid. Examples of other monomer units include glycol compounds such as ethylene glycol, propylene glycol, butanediol, heptanediol, hexanediol, octanediol, nonanediol, decanediol, 1,4-cyclohexanedimethanol, neopentyl glycol, glycerin, pentaerythritol, bisphenol A, polyethylene glycol, polypropylene glycol, and polytetramethylene glycol; dicarboxylic acids such as oxalic acid, adipic acid, sebacic acid, azelaic acid, dodecanedioic acid, malonic acid, glutaric acid, cyclohexanedicarboxylic acid, terephthalic acid, isophthalic acid, phthalic acid, naphthalene dicarboxylic acid, bis(p-carboxyphenyl)methane, anthracene dicarboxylic acid, 4,4'-diphenyl ether dicarboxylic acid, 5-sodium sulfoisophthalic acid, and 5-tetrabutylphosphonium isophthalic acid; hydroxycarboxylic acids such as glycolic acid, hydroxy propionic acid, hydroxy butyric acid, hydroxy valeric acid, hydroxy caproic acid, and hydroxy benzoic acid; and lactones such as caprolactone, valerolactone, propiolactone, undecalactone, and 1,5-oxepan-2-one. These other copolymer components are preferably 0 to 30 mol % and more preferably 0 to 10 mol %, based on the total monomer components.

In the present invention, it is preferable to use a polylactide resin (A-1) having a lactic acid component with high optical purity from the standpoint of mechanical properties, thermal properties, and flame retardancy. In other words, in the total lactic acid components of the polylactide resin (A-1), it is preferred that L-isomers be contained in an amount of 80% or more or that D-isomers be contained in an amount of 80% or more; it is more preferred that L-isomers be contained in an amount of 90% or more or that D-isomers be contained in an amount of 90% or more; it is still more preferred that L-isomers be contained in an amount of 95% or more or that D-isomers be contained in an amount of 95% or more; and it is most preferred that L-isomers be contained in an amount of 98% or more or that D-isomers be contained in an amount of 98% or more.

Further, it is also preferable to use a polylactic acid in which L-isomers are contained in an amount of 80% or more and a polylactic acid in which D-isomers are contained in an amount of 80% or more in combination, and it is more preferable to use a polylactic acid in which L-isomers are contained in an amount of 90% or more and a polylactic acid in which D-isomers are contained in an amount of 90% or more in combination.

As the polylactide resin (A-1) in the present invention, modified one may be used, and mechanical properties as well as heat resistance tend to be improved by using, for example, maleic anhydride-modified polylactide resin, epoxy-modified polylactide resin, amine-modified polylactide resin, and the like, which is preferred.

As a method of preparing the polylactide resin (A-1) in the present invention, known polymerization methods can be used, and examples thereof include the direct polymerization method from lactic acid, the ring-opening polymerization method mediated by lactide, and the like.

Although the molecular weight of the polylactide resin (A-1) in the present invention is not particularly restricted, the weight average molecular weight is preferably 100,000 or more, more preferably 150,000 or more, and most preferably 180,000 or more. The upper limit is preferably not more than 400,000 in terms of fluidity during molding. The weight average molecular weight as used herein refers to a polymethyl methacrylate (PMMA) equivalent weight average molecular weight measured by gel permeation chromatography (hereinafter referred to as GPC).

Although the melting point of the polylactide resin (A-1) in the present invention is not particularly restricted, it is preferably 120° C. or more, more preferably 150° C. or more, and most preferably 160° C. or more. The higher the optical purity is, the higher the melting point of the polylactide resin (A-1) tends to be, and therefore, as the polylactide resin having a high melting point described above, a polylactide resin with high optical purity is preferably used.

As the polylactide resin (A-1) used in the present invention, a polylactic acid stereocomplex is preferably used in terms of heat resistance. Examples of methods of forming a polylactic acid stereocomplex include the method of mixing poly-L-lactic acid in which L-isomers constitute 90 mol % or more, preferably 95 mol % or more, and more preferably 98 mol % or more with poly-D-lactic acid in which D-isomers constitute 90 mol % or more, preferably 95 mol % or more, and more preferably 98 mol % or more by melt-kneading, solution-kneading, solid phase-kneading, or the like. In the method for obtaining a polylactic acid stereocomplex by mixing, although both of poly-L-lactic acid and poly-D-lactic acid may have a weight average molecular weight of 100,000 or more, it is preferable to use a combination of one of poly-L-lactic acid and poly-D-lactic acid having a weight average molecular weight of 100,000 or less, preferably 50,000 or less, and the other having a weight average molecular weight of more than 100,000, preferably 120,000 or more. Other examples include the method of block-copolymerizing poly-L-lactic acid with poly-D-lactic acid, that is, producing stereoblock polylactic acid, and the method of block-copolymerizing poly-L-lactic acid with poly-D-lactic acid is preferred in that a polylactic acid stereocomplex can be readily formed.

In the present invention, the thermoplastic resin comprising polylactide resin (A) may be the polylactide resin (A-1) alone or may comprise the thermoplastic resin other than polylactide resin (A-2) in addition to the polylactide resin (A-1). When the thermoplastic resin other than polylactide resin (A-2) is contained, the thermoplastic resin other than polylactide resin (A-2) refers to a resin other than polylactide resin, which resin shows fluidity upon heating and therefore can be processed by molding.

Specific examples thereof include, for example, olefin resins such as polypropylene resin, polyethylene resin, and ethylene/α-olefin copolymer ("/" denotes copolymerization); styrene resins such as polystyrene resin, styrene/acrylonitrile copolymer, acrylonitrile/butadiene/styrene copolymer (ABS resin), and methyl(meth)acrylate/styrene copolymer; acrylic resins such as polymethyl methacrylate resin, polymethyl acrylate resin, and polybutyl acrylate resin; polyvinyl alcohol resins; polyester resins other than polylactide resin; polycarbonate resins; polyamide resins; polyphenylene oxide resins; modified polyphenylene oxide resins; polyphenylene sulfide resins; polyoxymethylene resins; phenoxy resins; and phenol resins, among which polycarbonate resins, olefin resins, styrene resins, acrylic resins, and polyester resins other than polylactic acid resin are preferred from the standpoint of molding processability, shock resistance, and heat resistance, which are the effects of the present invention, and, in particular, polycarbonate resins are most preferred from the standpoint of shock resistance and flame retardancy, which are the effects of the present invention. The thermoplastic resin other than polylactide resin (A-2) may be used alone, or two or more thereof can be used in combination.

In the case where the thermoplastic resin other than polylactide resin (A-2) is contained in the thermoplastic resin comprising polylactide resin (A) of the present invention, the blending ratio (weight ratio) of the polylactide resin (A-1) to the thermoplastic resin other than polylactide resin (A-2) is preferably (A-1) 1 to 99% by weight/(A-2) 99 to 1% by weight, more preferably (A-1) 5 to 95% by weight/(A-2) 95 to 5% by weight, and most preferably (A-1) 10 to 90% by weight/(A-2) 90 to 10% by weight, based on 100% by weight of the total of (A-1) and (A-2).

In the present invention, when the thermoplastic resin other than polylactide resin (A-2) is a polycarbonate resin, the polycarbonate resin as used herein is, preferably, a thermoplastic resin obtained by reacting a di- or polyhydric phenolic compound with a carbonic acid diester compound such as phosgene or diphenyl carbonate.

Examples of the di- or polyhydric phenolic compound described above include, but are not limited to, dihydroxy diaryl alkanes such as 2,2-bis(4-hydroxyphenyl)propane (commonly known as bisphenol A), bis(4-hydroxyphenyl) methane, bis(4-hydroxyphenyl)phenylmethane, bis(4-hydroxyphenyl)naphthylmethane, bis(4-hydroxyphenyl)-(4-isopropylphenyl)methane, bis(3,5-dichloro-4-hydroxyphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl) ethane, 2-methyl-1,1-bis(4-hydroxyphenyl)propane, 2,2-bis (3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl) propane, 2,2-bis(3-methyl-4-hydroxyphenyl)propane, 2,2-bis(3-fluoro-4-hydroxyphenyl)propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl) pentane, 4-methyl-2,2-bis(4-hydroxyphenyl)pentane, 2,2-bis (4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl)-3,3,5-trimethylcyclohexane, and 2,2-bis(4-hydroxyphenyl)-1,1,1, 3,3,3-hexafluoropropane; dihydroxydiarylcycloalkanes such as 1,1-bis(4-hydroxyphenyl)cyclohexane, 1,1-bis(3,5-dichloro-4-hydroxyphenyl)cyclohexane, and 1,1-bis(4-hydroxyphenyl)cyclodecane; dihydroxydiarylsulfones such as bis(4-hydroxyphenyl)sulfone, bis(3,5-dimethyl-4-hydroxyphenyl)sulfone, and bis(3-chloro-4-hydroxyphenyl)sulfone; dihydroxyaryl ethers such as bis(4-hydroxyphenyl) ether and bis(3,5-dimethyl-4-hydroxyphenyl)ether; dihydroxydiarylketones such as 4,4'-dihydroxybenzophenone and 3,3',5,5'-tetramethyl-4,4'-dihydroxybenzophenone; dihydroxydiaryl sulfides such as bis(4-hydroxyphenyl)sulfide, bis(3-methyl-4-hydroxyphenyl)sulfide, and bis(3,5-dimethyl-4-hydroxyphenyl)sulfide; dihydroxydiaryl sulfoxides such as bis(4-hydroxyphenyl)sulfoxide; dihydroxydiphenyls such as 4,4'-dihydroxydiphenyl; dihydroxyaryl fluorenes such as 9,9-bis(4-hydroxyphenyl)fluorene; and the like. Further, in addition to the dihydric phenolic compounds described above, dihydroxybenzenes such as hydroquinone, resorcinol, and methylhydroquinone; dihydroxynaphthalenes such as 1,5-dihydroxynaphthalene and 2,6-dihydroxynaphthalene; or the like can be used as a dihydric phenolic compound.

A tri- or polyhydric phenolic compound can also be used to the extent that the thermoplasticity of the polycarbonate resin to be obtained is maintained. Examples of the tri- or polyhydric phenolic compound described above include 2,4,4'-trihydroxybenzophenone, 2,2',4,4'-tetrahydroxybenzophenone, 2,4,4'-trihydroxyphenyl ether, 2,2',4,4'-tetrahydroxyphenyl ether, 2,4,4'-trihydroxydiphenyl-2-propane, 2,2'-bis(2,4-dihydroxy)propane, 2,2',4,4'-tetrahydroxydiphenylmethane, 2,4,4'-trihydroxydiphenylmethane, 1-[α-methyl-α-(4'-dihydroxyphenyl)ethyl]-3-[α',α'-bis(4''-hydroxyphenyl) ethyl]benzene, 1-[α-methyl-α-(4'-dihydroxyphenyl)ethyl]-4-[α',α'-bis(4''-hydroxyphenyl)ethyl]benzene, α,α',α''-tris (4-hydroxyphenyl)-1,3,5-triisopropylbenzene, 2,6-bis(2-hydroxy-5'-methylbenzyl)-4-methylphenol, 4,6-dimethyl-2, 4,6-tris(4'-hydroxyphenyl)-2-heptene, 4,6-dimethyl-2,4,6-tris(4'-hydroxyphenyl)-2-heptane, 1,3,5-tris(4'-hydroxyphenyl)benzene, 1,1,1-tris(4-hydroxyphenyl) ethane, 2,2-bis[4,4-bis(4'-hydroxyphenyl)cyclohexyl] propane, 2,6-bis(2'-hydroxy-5'-isopropylbenzyl)-4-isopropylphenol, bis[2-hydroxy-3-(2'-hydroxy-5'-methylbenzyl)-5-methylphenyl]methane, bis[2-hydroxy-3-(2'-hydroxy-5'-isopropylbenzyl)-5-methylphenyl]methane, tetrakis(4-hydroxyphenyl)methane, tris(4-hydroxyphenyl) phenylmethane, 2',4',7-trihydroxyflavan, 2,4,4-trimethyl-2', 4',7-trihydroxyflavan, 1,3-bis(2',4'-dihydroxyphenyl isopropyl)benzene, tris(4'-hydroxyphenyl)-amyl-s-triazine, and the like.

These di- or polyhydric phenolic compounds each may be used alone, or two or more of them may be combined.

The polycarbonate resin used in the present invention can contain, if necessary, a component for making a branched polycarbonate resin in addition to the tri- or polyhydric phenolic compound to the extent that the effects of the present invention are not impaired. Examples of the component (branching agent) other than the tri- or polyhydric phenolic compound used to obtain the branched polycarbonate resin described above include phloroglucin, mellitic acid, trimellitic acid, trimellitic acid chloride, trimellitic anhydride, gallic acid, n-propyl gallate, protocatechuic acid, pyromellitic acid, pyromellitic dianhydride, α-resorcin acid, β-resorcin acid, resorcin aldehyde, trimethylchloride, isatin-bis(o-cresol), trimethyl trichloride, 4-chloroformyl phthalic anhydride, benzophenone tetracarboxylic acid, and the like.

In addition to the above, as a copolymer component of the polycarbonate resin used in the present invention, for example, linear aliphatic dihydric carboxylic acids such as adipic acid, pimelic acid, suberic acid, azelaic acid, sebacic acid, and decane dicarboxylic acid and siloxane compounds such as dimethylsiloxane may be used.

As a component of the polycarbonate resin used in the present invention, known various components used as a terminator in polymerization can be used, if necessary, to the extent that the effects of the present invention are not impaired. Specific examples include monohydric phenolic compounds such as phenol, p-cresol, p-tert-butylphenol, p-tert-octyiphenol, p-cumylphenol, bromophenol, tribromophenol, nonylphenol, and the like.

Examples of the carbonic acid diester compound used as a material of the polycarbonate resin used in the present invention include diaryl carbonates such as diphenyl carbonate and dialkyl carbonates such as dimethyl carbonate and diethyl carbonate.

Preferred specific examples of the polycarbonate resin used in the present invention include, for example, polycarbonate resins obtained by the interfacial polycondensation method in which bisphenol A is reacted with phosgene, polycarbonate resins obtained by the melt polymerization method in which bisphenol A is reacted with diphenyl carbonate, and the like.

The number average molecular weight (Mn) of the polycarbonate resin used in the present invention is preferably 3,000 to 50,000, more preferably 4,000 to 40,000, and most preferably 5,000 to 30,000. The number average molecular weight (Mn) as used herein refers to a PMMA equivalent number average molecular weight measured using GPC by dissolving a polycarbonate resin in tetrahydrofuran.

The thermoplastic resin composition of the present invention preferably comprises 1 to 100 parts by weight of a flame retardant (B) containing any one or more flame retardants (B-1) selected from melamine phosphate, melamine pyrophosphate, and melamine polyphosphate and any one or more flame retardants (B-2) selected from piperazine phosphate, piperazine pyrophosphate, and piperazine polyphosphate, based on 100 parts by weight of the thermoplastic resin comprising polylactide resin (A), wherein the amount of the flame retardant (B) is more preferably 3 to 90 parts by weight, still more preferably 5 to 80 parts by weight, and most preferably 10 to 70 parts by weight.

Any one or more flame retardants (B-1) selected from melamine phosphate, melamine pyrophosphate, and melamine polyphosphate of the present invention refers to salts of melamine and one or more inorganic phosphorus compounds selected from phosphoric acid, pyrophosphoric acid, and polyphosphoric acid, and these can be used alone or as a mixture.

Although the blending ratio of the melamine to the inorganic phosphorus compounds described above is not particularly restricted as long as flame retardancy, the effects of the present invention, is expressed, preferably, the molar ratio of nitrogen atoms of the melamine to phosphorus atoms of the inorganic phosphorus compound is preferably 1:5 to 5:1, and more preferably 1:3 to 3:1.

Among any one or more flame retardants (B-1) selected from melamine phosphate, melamine pyrophosphate, and melamine polyphosphate of the present invention, most preferred is melamine pyrophosphate from the standpoint of flame retardancy.

Preparation of salts of melamine and inorganic phosphorus compounds is not particularly restricted, and, in the case of melamine pyrophosphate, for example, the salts can be obtained by reacting sodium pyrophosphate with melamine at any reaction rate with hydrochloric acid added and neutralizing the resultant with sodium hydroxide.

Any one or more flame retardants (B-2) selected from piperazine phosphate, piperazine pyrophosphate, and piperazine polyphosphate of the present invention refers to salts of piperazine and one or more inorganic phosphorus compounds selected from phosphoric acid, pyrophosphoric acid, and polyphosphoric acid, and these can be used alone or as a mixture.

Although the blending ratio of the piperazine to the inorganic phosphorus compounds described above is not particularly restricted as long as flame retardancy, the effects of the present invention, is expressed, preferably, the molar ratio of nitrogen atoms of the piperazine to phosphorus atoms of the inorganic phosphorus compound is preferably 1:5 to 5:1, and more preferably 1:3 to 3:1.

Among any one or more flame retardants (B-2) selected from piperazine phosphate, piperazine pyrophosphate, and piperazine polyphosphate of the present invention, most preferred is piperazine pyrophosphate from the standpoint of flame retardancy.

Preparation of salts of piperazine and inorganic phosphorus compounds is not particularly restricted, and, in the case of piperazine pyrophosphate, for example, the salts can be obtained as poorly water-soluble precipitates by reacting piperazine with pyrophosphoric acid in water or in an aqueous methanol solution.

The blending ratio of the (B-1) component to the (B-2) component in the flame retardant (B) of the present invention is preferably (B-1) 1 to 99% by weight/(B-2) 99 to 1% by weight, more preferably (B-1) 10 to 90% by weight/(B-2) 90 to 10% by weight, and most preferably (B-1) 20 to 80% by weight/(B-2) 80 to 20% by weight, based on 100% by weight of the total of the (B-1) component and the (B-2) component.

Compounds other than the (B-1) component and the (B-2) component can also be added into the flame retardant (B) of the present invention. Examples of compounds other than the (B-1) component and the (B-2) component include silicone oil, a monoamide compound of higher aliphatic carboxylic acid, a monoester compound obtained by reacting higher aliphatic carboxylic acid with an alcohol compound, and the like. Further, the metal oxide (E) described below can be blended into the flame retardant (B) of the present invention.

In the present invention, the major axis of the largest particle of the flame retardant (B) in the resin composition according to transmission electronic microscopy is advantageously not more than 10 μm, preferably not more than 9.5 μm, and most preferably not more than 9 μm.

In the present invention, the ratio, according to transmission electronic microscopy, of the number of particles of the flame retardant (B) having a major axis of not more than 3 μm relative to the number of particles of the flame retardant (B) per an area of 1,000 μm² in the resin composition is preferably 70% or more, more preferably 73% or more, and most preferably 75% or more. The lower limit is preferably 0.3 μm, more preferably 0.4 μm, and most preferably 0.5 μm.

The major axis of the largest particle of the flame retardant (B) and the ratio of the number of particles of the (B) flame retardant having a major axis of not more than 3 μm relative to the number of particles of the flame retardant (B) per an area of 1,000 μm² in the resin composition according to transmission electronic microscopy can be measured by, for example, cutting an ultrathin section using ultramicrotome out of an extrusion-molded article and an injection-molded article of the resin composition, observing ten photographs of the ultrathin section at arbitrary points magnified 500 times using Model H-7100 transmission electronic microscope manufactured by Hitachi, Ltd., determining the major axis of the largest particle of the flame retardant (B) of the ten photographs and the ratio of the number of particles of the flame retardant (B) having a major axis of not more than 3 μm relative to the number of particles of the flame retardant (B) per an area of 1,000 μm² for one photograph, and calculating the mean value of the ten photographs.

In the present invention, when the major axis of the largest particle of the flame retardant (B) in the resin composition according to transmission electronic microscopy is not more than 10 μm, and the ratio of the number of particles of the flame retardant (B) having a major axis of not more than 3 μm relative to the number of particles of the flame retardant (B) per an area of 1,000 μm² in the resin composition is 70% or more, the flame retardant (B) forms an uniform foam insulation layer and exerts an extremely excellent flame retardancy-improving effect when the resin composition is flamed.

In the present invention, as a method for achieving a major axis of the largest particle of the flame retardant (B) in the resin composition according to transmission electronic microscopy of not more than 10 μm and a ratio of the number of particles of the (B) flame retardant having a major axis of not more than 3 μm relative to the number of particles of the flame retardant (B) per an area of 1,000 μm² in the resin composition of 70% or more, for example, a method in which the flame retardant (B) before addition or a mixture of the flame retardant (B) with the metal oxide (E) described below is pulverized with a pulverizer such as a jet mill, a method in which the (B-1) component and the (B-2) component in the flame retardant (B) is separately pulverized and then mixed to obtain the flame retardant (B), and a method in which a masterbatch that highly contains the flame retardant (B) is prepared by melt-kneading the thermoplastic resin comprising polylactide resin (A) and the flame retardant (B), and the masterbatch and the thermoplastic resin comprising polylactide resin (A) are melt-kneaded can be used. The above-described methods may be each individually performed, or the methods may be performed in combination.

In the present invention, when the flame retardant (B) before addition or a mixture of the flame retardant (B) with the metal oxide (E) described below is pulverized, or when the (B-1) component and the (B-2) component are separately pulverized and then mixed to obtain the flame retardant (B), the post-pulverization mode diameter of the flame retardant (B) in particle size distribution measurement is preferably not more than 4 μm, more preferably not more than 3.5 μm, and most preferably not more than 3 μm. The mode diameter of the (B) flame retardant in particle size distribution measurement as used herein means the maximum value of the particle size distribution curve (frequency) measured using SALD-2100 manufactured by Shimadzu Corporation after dispersing the flame retardant (B) in a methanol solvent in 0.03% by weight concentration and ultrasonicating the resultant for 10 minutes, i.e., the most common particle diameter in the flame retardant (B).

Further, it is preferable to add the condensed phosphate ester (H) to the thermoplastic resin composition of the present invention from the standpoint of high improvement in flame retardancy. Preferred examples of the condensed phosphate ester (H) that can be contained in the thermoplastic resin composition of the present invention include an aromatic condensed phosphate ester represented by the formula (1) below from the standpoint of flame retardancy and hydrolyzability.

[Chemical formula 1]

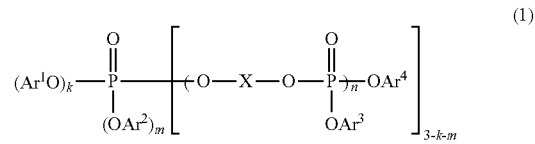

(1)

(In the above formula, $Ar^1$, $Ar^2$, $Ar^3$, and $Ar^4$ represent the same or different halogen-free aromatic groups. X represents a structure selected from the formulas (2) to (4) below, and in the formulae (2) to (4) below, $R^1$ to $R^8$ represent the same or different hydrogen atom or a $C_1$-$C_5$ alkyl group, and Y represents direct binding, O, S, $SO_2$, $C(CH_3)_2$, $CH_2$, or CHPh, wherein Ph represents a phenyl group. In the formula (1), n is an integer of 1 or more. In the formula (1), k and m are each an integer from 0 to 2, and (k+m) is an integer from 0 to 2.) Such an aromatic condensed phosphate ester may be a mixture of aromatic condensed phosphate esters having different n or different structures.

[Chemical formula 2]

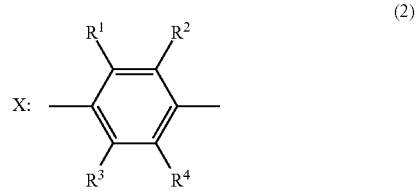

(2)

[Chemical formula 3]

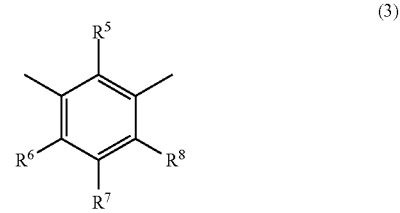

(3)

[Chemical formula 4]

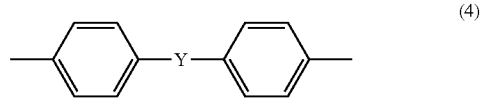

(4)

In the above formula (1), n is an integer of 1 or more, and the upper limit is preferably up to 40 in terms of flame retardancy. It is preferably 1 to 10, and particularly preferably 1 to 5.

k and m are each an integer from 0 to 2, and k+m is an integer from 0 to 2; preferably, k and m are each an integer from 0 to 1, and particularly preferably, k and m are each 1.

In the above formulas (2) to (4), $R^1$ to $R^8$ represent the same or different hydrogen or a $C_1$-$C_5$ alkyl group. Specific examples of $C_1$-$C_5$ alkyl groups include methyl, ethyl, n-propyl, isopropyl, n-butyl, sec-butyl, tert-butyl, neopentyl, and the like. Hydrogen, methyl, and ethyl are preferred, and, particularly, hydrogen is preferred.

$Ar^1$, $Ar^2$, $Ar^3$, and $Ar^4$ represent the same or different halogen-free aromatic groups. Examples of such aromatic groups include aromatic groups having a benzene skeleton, naphthalene skeleton, indene skeleton, and anthracene skeleton, among which those having a benzene skeleton or naphthalene skeleton are preferred. These may be substituted with a halogen-free organic residue (preferably a $C_1$-$C_8$ organic residue), and the number of the substituent is, although not particularly restricted, preferably 1 to 3. Specific examples include aromatic groups such as phenyl, tolyl, xylyl, cumenyl, mesityl, naphthyl, indenyl, and anthryl. Phenyl, tolyl, xylyl, cumenyl, and naphthyl are preferred, and phenyl, tolyl, and xylyl are particularly preferred.

In particular, the compound (5), (6), and (7) described below are preferred.

When the condensed phosphate ester (H) is added to the thermoplastic resin composition of the present invention, the amount of the condensed phosphate ester (H) is preferably 1 to 50 parts by weight, more preferably 2 to 40 parts by weight, and most preferably 3 to 30 parts by weight, based on 100 parts by weight of the thermoplastic resin comprising polylactide resin (A).

When the condensed phosphate ester (H) is added to the thermoplastic resin composition of the present invention, the blending ratio of the flame retardant (B) to the condensed phosphate ester (H) (the ratio of the flame retardant (B)/the condensed phosphate ester (H)) is preferably 90/10 to 60/40 in weight ratio, more preferably 87/13 to 63/37, and most preferably 85/15 to 65/35 from the standpoint of the balance among flame retardancy, heat resistance, and mechanical properties.

To the thermoplastic resin composition of the present invention, it is preferable to further add the crystal nucleating agent (C) in an amount of 0.01 to 50 parts by weight, more preferably 0.05 to 40 parts by weight, and most preferably 0.1 to 30 parts by weight, based on 100 parts by weight of the thermoplastic resin comprising polylactide resin (A).

When the crystal nucleating agent (C) is added to the thermoplastic resin composition of the present invention, as

[Chemical formula 5]

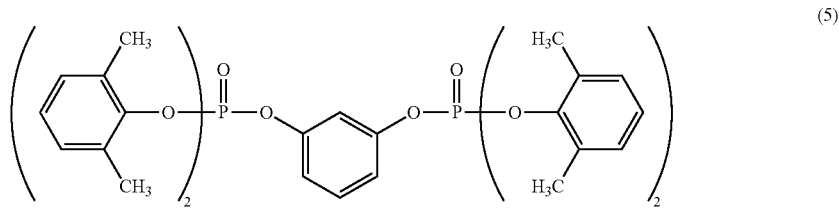

(5)

[Chemical formula 6]

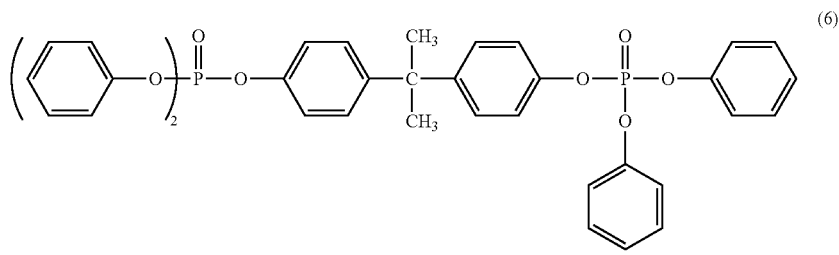

(6)

[Chemical formula 7]

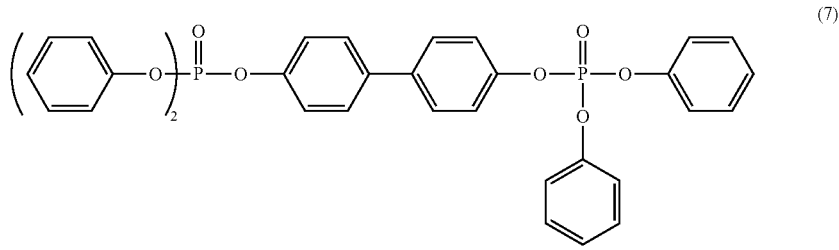

(7)

Examples of commercially available aromatic condensed phosphate esters include PX-200, PX-201, PX-202, CR-733S, CR-741, CR747, and the like available from DAIHACHI CHEMICAL INDUSTRY CO., LTD. and FP-600, FP-700, FP-800, and the like available from ADEKA COPORATION.

The condensed phosphate ester (H) in the present invention may be used alone or in combination of two or more.

the crystal nucleating agent (C), those which are commonly used as a crystal nucleating agent for polymer may be used without particular limitation, and any crystal nucleating agent can be used as long as it is one or more crystal nucleating agents selected from inorganic crystal nucleating agents and organic crystal nucleating agents.

Specific examples of inorganic crystal nucleating agents include talc, kaolinite, mica, synthetic mica, clay, zeolite, silica, carbon black, calcium sulfide, magnesium carbonate, calcium carbonate, barium sulfate, and the like. Talc, kaolinite, mica, and synthetic mica are preferred because of their large heat resistance-improving effect, and talc is more preferred in terms of moldability. These may be used alone or in combination of two or more. These inorganic crystal nucleating agents are preferably modified by organic matter to increase the dispersibility in the composition.

Specific examples of organic crystal nucleating agents include, for example, organic metal carboxylates such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, toluic acid sodium, sodium salicylate, potassium salicylate, zinc salicylate, aluminum dibenzoate, potassium dibenzoate, lithium dibenzoate, sodium β-naphthalate, and sodium cyclohexanecarboxylate; organic sulfonates such as sodium p-toluenesulfonate and sodium sulfoisophthalate; carboxylic acid amides such as trimesic acid tris(t-butylamide); hydrazide compounds such as adipic acid dihydrazide, phthalic acid dihydrazide, and N,N'-dibenzoyl sebacic acid dihydrazide; sodium salts or potassium salts of polymer having a carboxyl group such as a sodium salt of ethylene/acrylic acid or ethylene/methacrylic acid copolymer and a sodium salt of styrene/maleic anhydride copolymer (so-called ionomer); benzylidene sorbitol and derivatives thereof; phosphorus compound metal salts such as sodium-2,2'-methylene bis(4,6-di-tert-butylphenyl)phosphate; and phosphonic acid metal salts having an aromatic ring such as 2,2-methyl bis(4,6-di-tert-butylphenyl)sodium, magnesium phenylphosphonate, calcium phenylphosphonate, and zinc phenylphosphonate, and organic metal carboxylates, carboxylic acid amides, hydrazide compounds, and phosphonic acid metal salts having an aromatic ring are preferred because of their large heat resistance-improving effect. These may be used alone or in combination of two or more.

To the thermoplastic resin composition of the present invention, it is preferable to further add the fluorine-based resin (D) in an amount of 0.01 to 10 parts by weight, more preferably 0.05 to 8 parts by weight, and most preferably 0.1 to 5 parts by weight, based on 100 parts by weight of the thermoplastic resin comprising polylactide resin (A).

When the fluorine-based resin (D) is added to the thermoplastic resin composition of the present invention, the fluorine-based resin (D) is preferably a resin containing fluorine in the molecule of the material, specific examples of which include polytetrafluoroethylene, polyhexafluoropropylene, tetrafluoroethylene/hexafluoropropylene copolymer, tetrafluoroethylene/perfluoroalkyl vinyl ether copolymer, tetrafluoroethylene/ethylene copolymer, hexafluoropropylene/propylene copolymer, polyvinylidene fluoride, and vinylidene fluoride/ethylene copolymer, among which polytetrafluoroethylene, tetrafluoroethylene/perfluoroalkyl vinyl ether copolymer, tetrafluoroethylene/hexafluoropropylene copolymer, tetrafluoroethylene/ethylene copolymer, and polyvinylidene fluoride are preferred; polytetrafluoroethylene and tetrafluoroethylene/ethylene copolymer are particularly preferred; polytetrafluoroethylene is still more preferred; and polytetrafluoroethylene-containing powder mixture composed of polytetrafluoroethylene particles and an organic polymer is also preferably used. As a fluorine-based resin such as polytetrafluoroethylene, those having a molecular weight in the range of 100,000 to 10,000,000 are preferred, and, in particular, those having a molecular weight in the range of 100,000 to 1,000,000 are more preferred and particularly have the effect of improving the extrusion moldability and flame retardancy of the thermoplastic resin composition of the present invention. As a commercially available product of polytetrafluoroethylene, "Teflon (registered trademark)" 6-J, "Teflon (registered trademark)" 6C-J, and "Teflon (registered trademark)"62-J available from Du Pont-Mitsui Fluorochemicals Co., Ltd., "Fluon" CD1 and CD076 available from ASAHI ICI Fluoropolymers Co., Ltd., and the like are commercially available. As a commercially available product of polytetrafluoroethylene-containing powder mixture composed of polytetrafluoroethylene particles and an organic polymer, "METABLEN (registered trademark)"A-3000, "METABLEN (registered trademark)" A-3800, and the like are commercially available as "METABLEN (registered trademark)" A series from Mitsubishi Rayon Co., Ltd. Since polytetrafluoroethylene, such as "Teflon (registered trademark)" 6-J, is prone to aggregate, it can aggregate to form a cluster when strongly mixed together with another resin composition mechanically by, for example, a Henschel mixer, presenting a problem in handleability and dispersibility depending on mixing conditions. On the other hand, polytetrafluoroethylene-containing powder mixture composed of polytetrafluoroethylene particles and an organic polymer is excellent in the above handleability and dispersibility and particularly preferably used. Examples of the above-described polytetrafluoroethylene-containing powder mixture composed of polytetrafluoroethylene particles and an organic polymer include, but are not limited to, the polytetrafluoroethylene-containing powder mixture composed of polytetrafluoroethylene particles and an organic polymer disclosed in JP 2000-226523 A, and examples of the above-described organic polymer include an organic polymer containing 10% by weight or more of aromatic vinyl monomer, acrylic acid ester monomer, and vinyl cyanide monomer and a mixture thereof. The content of polytetrafluoroethylene in the polytetrafluoroethylene-containing powder mixture is preferably 0.1% by weight to 90% by weight.

To the thermoplastic resin composition of the present invention, from the standpoint of improving molding processability and flame retardancy, it is preferable to add the metal oxide (E) in an amount of 0.01 to 10 parts by weight, more preferably 0.05 to 8 parts by weight, and most preferably 0.1 to 5 parts by weight, based on 100 parts by weight of the thermoplastic resin comprising polylactide resin (A).

When the metal oxide (E) is added to the thermoplastic resin composition of the present invention, examples of the metal oxide (E) include zinc oxide, titanium oxide, aluminum oxide, magnesium oxide, silicon oxide, zirconium oxide, vanadium oxide, molybdenum oxide, and surface-treated products thereof, among which zinc oxide, titanium oxide, magnesium oxide, and silicon oxide are preferred from the standpoint of improving flame retardancy.

The metal oxide (E) described above can be added as it is to the thermoplastic resin comprising polylactide resin (A), and, as mentioned above, it can also be mixed with the flame retardant (B) in advance before being added to the thermoplastic resin comprising polylactide resin (A).

To the thermoplastic resin composition of the present invention, from the standpoint of improving molding processability, it is preferable to add the plasticizer (F) in an amount of 0.1 to 50 parts by weight, more preferably 0.5 to 40 parts by weight, and most preferably 1 to 30 parts by weight, based on 100 parts by weight of the thermoplastic resin comprising polylactide resin (A).

As the plasticizer (F) described above, known plasticizers generally used as a plasticizer for polymers can be used without particular limitation, and examples thereof include polyester plasticizers, glycerin plasticizers, polycarboxylic acid ester plasticizers, polyalkylene glycol plasticizers, and epoxy plasticizers.

Specific examples of polyester plasticizers include a polyester composed of acid components such as adipic acid, sebacic acid, terephthalic acid, isophthalic acid, naphthalene dicarboxylic acid, diphenyl dicarboxylic acid, and rosin and diol components such as propylene glycol, 1,3-butanediol, 1,4-butanediol, 1,6-hexanediol, ethylene glycol, and diethylene glycol, a polyester composed of hydroxycarboxylic acid such as polycaprolactone, and the like. These polyesters may be terminally capped with a monofunctional carboxylic acid or monofunctional alcohol, or may be terminally capped, for example, with an epoxy compound.

Specific examples of glycerin plasticizers include, for example, glycerin monoacetomonolaurate, glycerin diacetomonolaurate, glycerin monoacetomonostearate, glycerin diacetomonooleate, and glycerin monoacetomonomontanate.

Specific examples of polycarboxylic acid plasticizers include phthalic acid esters such as dimethyl phthalate, diethyl phthalate, dibutyl phthalate, dioctyl phthalate, diheptyl phthalate, dibenzyl phthalate, and butylbenzyl phthalate; trimellitic acid esters such as tributyl trimellitate, trioctyl trimellitate, and trihexyl trimellitate; adipic acid esters such as diisodicyl adipate, n-octyl n-decyl adipate, methyl diglycol butyl diglycol adipate, benzyl methyl diglycol adipate, and benzyl butyl diglycol adipate; citric acid esters such as acetyl triethyl citrate and acetyl tributyl citrate; and azelaic acid esters such as di-2-ethylhexyl azelate; sebacic acid esters such as dibutyl sebacate and di-2-ethylhexyl sebacate; and the like.

Specific examples of polyalkylene glycol plasticizers include polyalkylene glycols such as polyethylene glycol, polypropylene glycol, poly(ethylene oxide/propylene oxide) block and/or random copolymer, polytetramethylene glycol, ethylene oxide addition polymer of bisphenols, propylene oxide addition polymer of bisphenols, and tetrahydrofuran addition polymer of bisphenols; terminally-capped compounds thereof such as a terminal epoxy-modified compound, a terminal ester-modified compound, and a terminal ether-modified compound; and the like.

Although epoxy plasticizer generally refers to, for example, epoxy triglyceride made of alkyl epoxy stearate and soybean oil, so-called epoxy resin mainly composed of bisphenol A and epichlorohydrin can be used as well.

Specific examples of other plasticizers include, for example, benzoic acid esters of aliphatic polyol such as neopentyl glycol dibenzoate, diethylene glycol dibenzoate, and triethylene glycol di-2-ethyl butyrate; fatty acid amides such as stearic acid amide; aliphatic carboxylic acid esters such as butyl oleate; oxy acid esters such as methyl acetyl ricinoleate and butyl acetyl ricinoleate; pentaerythritol; polyacrylic acid esters, and paraffins. As the plasticizer described above, at least one selected from polyester plasticizers, glycerin plasticizers, and polyalkylene glycol plasticizers is particularly preferred among those which were exemplified above, and two or more of them may be used in combination.

To the thermoplastic resin composition of the present invention, from the standpoint of improving shock resistance, it is preferable to add the impact modifier (G) in an amount of 0.1 to 50 parts by weight, more preferably 0.5 to 40 parts by weight, and most preferably 1 to 30 parts by weight, based on 100 parts by weight of the thermoplastic resin comprising polylactide resin (A).

The impact modifier (G) described above, although not particularly restricted as long as it can be used to improve the shock resistance of the thermoplastic resin, means a polymer that exhibits rubber elasticity at room temperature other than the thermoplastic resin other than polylactide resin (A-2).

Specific examples of the impact modifier (G) in the present invention include, for example, ethylene-propylene copolymer, ethylene-propylene-unconjugated diene copolymer, ethylene-butene-1 copolymer, various acryl rubbers, core-shell type rubber, ethylene-acrylic acid copolymer and an alkali metal salt thereof (so-called ionomer), ethylene-alkyl acrylate ester copolymer (for example, ethylene-ethyl acrylate copolymer, ethylene-butyl acrylate copolymer), acid-modified ethylene-propylene copolymer, diene rubbers (for example, polybutadiene, polyisoprene, and polychloroprene), copolymer of a diene and a vinyl monomer (for example, styrene-butadiene random copolymer, styrene-butadiene block copolymer, styrene-butadiene-styrene block copolymer and hydrogenated versions thereof, styrene-isoprene random copolymer, styrene-isoprene block copolymer, and styrene-isoprene-styrene block copolymer and hydrogenated versions thereof), polyisobutylene, copolymer of isobutylene and butadiene or isoprene, natural rubber, thiokol rubber, polysulfide rubber, silicone rubber, polyurethane rubber, polyether rubber, epichlorohydrin rubber, polyester elastomer, and polyamide elastomer; more preferred are ethylene-propylene copolymer, ethylene-butene-1 copolymer, core-shell type rubber, copolymer of a diene and a vinyl monomer, polyester elastomer, and polyamide elastomer, and most preferred is the core-shell type rubber (G-1).

The core-shell type rubber (G-1) in the present invention is a polymer having a structure composed of a core layer (the innermost layer) and one or more layers (shell layer) that overlie it, wherein the layers adjacent to each other are composed of different polymers. The number of the layers constituting the core-shell type rubber described above is not particularly limited; it is preferably two or more layers, and it may be three or more layers or four or more layers. The core-shell type rubber described above preferably has at least one or more rubber layers therein and more preferably has a rubber layer as a core layer (the innermost layer).

In the core-shell type rubber (G-1) in the present invention, the type the rubber layer is not particularly limited, and it may be any type as long as it is composed of polymer components having rubber elasticity. Examples thereof include rubbers composed of a polymer of acrylic components, silicone components, styrene components, nitrile components, conjugated diene components, urethane components, ethylene propylene components, or the like. Preferred example of rubbers include a rubber composed of a polymer of acrylic components such as ethyl acrylate units and butyl acrylate units, silicone components such as dimethylsiloxane units and phenyl methyl siloxane units, styrene components such as styrene units and α-methylstyrene units, nitrile components such as acrylonitrile units and methacrylonitrile units, or conjugated diene components such as butanediene units and isoprene units. A rubber composed of a copolymer of these components in combination of two or more is also preferred, and examples thereof include (i) a rubber composed of a component obtained by copolymerizing acrylic components such as ethyl acrylate units and butyl acrylate units and silicone components such as dimethylsiloxane units and phenyl methyl siloxane units, (ii) a rubber composed of a component obtained by copolymerizing acrylic components such as ethyl acrylate units and butyl acrylate units and styrene components such as styrene units and α-methylstyrene units, (iii) a rubber composed of a component obtained by copolymerizing acrylic components such as ethyl acrylate units and butyl acrylate units and conjugated diene components such as butanediene units and isoprene units, (iv) a rubber composed of a component obtained by copolymerizing acrylic components such as ethyl acrylate units and butyl acrylate units, silicone components such as dimethylsiloxane units and phenyl methyl siloxane units, and styrene components such as styrene units and α-methylstyrene units, and the like. In addition to these components, a rubber obtained by copolymerization and cross-linking of a crosslinkable component such as divinylbenzene units, allyl acrylate units, or butylene glycol diacrylate units is also preferred.

More preferred specific examples of the rubber layer include a rubber composed of a component obtained by polymerizing acrylic components such as ethyl acrylate units and butyl acrylate units, a rubber composed of a component obtained by polymerizing silicone components such as dimethylsiloxane units and phenyl methyl siloxane units, and a combination thereof, i.e., a rubber composed of a component obtained by copolymerizing acrylic components such as ethyl acrylate units and butyl acrylate units and silicone components such as dimethylsiloxane units and phenyl methyl siloxane units. The most preferred rubber layer is a rubber composed of a component obtained by polymerizing acrylic components such as ethyl acrylate units and butyl acrylate units.

In the present invention, for significant expression of shock resistance, which is the effect of the present invention, one containing a glycidyl group(s) in the outermost layer of the core-shell type rubber (G-1) is preferred. Examples of the core-shell type rubber containing a glycidyl group(s) in the outermost layer include, but are not limited to, a polymer of glycidyl group-containing vinyl units as a glycidyl group-containing compound contained in the outermost layer. Specific examples of glycidyl group-containing vinyl units include, for example, glycidyl (meth)acrylate, glycidyl itaconate, diglycidyl itaconate, allyl glycidyl ether, styrene-4-glycidyl ether, or 4-glycidyl styrene, and glycidyl (meth)acrylate is most preferably used from the standpoint of improving shock resistance. These units can be used alone or in combination of two or more.

In the core-shell type rubber (G-1) in the present invention, the shell layer including the outermost layer may contain, in addition to the polymer of glycidyl group-containing vinyl units described above, a polymer containing at least one or more units selected from, for example, unsaturated carboxylic acid alkyl ester units, unsaturated dicarboxylic acid anhydride units, aliphatic vinyl units, aromatic vinyl units, vinyl cyanide units, maleimide units, unsaturated dicarboxylic acid units, and other vinyl units, and, in particular, it is preferred that a polymer containing at least one or more units selected from unsaturated carboxylic acid alkyl ester units and unsaturated dicarboxylic acid anhydride units be contained.

Examples of unsaturated carboxylic acid alkyl ester units that are preferably used include, but are not limited to, (meth)acrylic acid alkyl ester. Specific examples thereof include, for example, methyl (meth)acrylate, ethyl (meth)acrylate, n-propyl (meth)acrylate, n-butyl (meth)acrylate, tert-butyl (meth)acrylate, n-hexyl (meth)acrylate, 2-ethylhexyl (meth)acrylate, cyclohexyl (meth)acrylate, stearyl (meth)acrylate, octadecyl (meth)acrylate, phenyl (meth)acrylate, benzyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4,5,6-pentahydroxyhexyl (meth)acrylate, 2,3,4,5-tetrahydroxypentyl (meth)acrylate, aminoethyl acrylate, propylaminoethyl acrylate, dimethylaminoethyl methacrylate, ethylaminopropyl methacrylate, phenylaminoethyl methacrylate, or cyclohexylaminoethyl methacrylate, and methyl (meth)acrylate is preferably used because of its large shock resistance-improving effect. These units can be used alone or in combination of two or more.

Examples of unsaturated dicarboxylic acid anhydride units include maleic anhydride, itaconic anhydride, glutaconic anhydride, citraconic anhydride, or aconitic anhydride, and maleic anhydride is preferably used because of its large shock resistance-improving effect. These units can be used alone or in combination of two or more.

Examples of aliphatic vinyl units include ethylene, propylene, or butadiene; examples of aromatic vinyl units include styrene, α-methylstyrene, 1-vinylnaphthalene, 4-methylstyrene, 4-propylstyrene, 4-cyclohexylstyrene, 4-dodecylstyrene, 2-ethyl-4-benzylstyrene, 4-(phenylbutyl)styrene, or halogenated styrene; examples of vinyl cyanide units include acrylonitrile, methacrylonitrile, or ethacrylonitrile; examples of maleimide units include maleimide, N-methylmaleimide, N-ethylmaleimide, N-propylmaleimide, N-isopropylmaleimide, N-cyclohexylmaleimide, N-phenylmaleimide, N-(p-bromophenyl)maleimide, or N-(chlorophenyl)maleimide; examples of unsaturated dicarboxylic acid units include maleic acid, maleic acid monoethyl ester, itaconic acid, and phthalic acid; and examples of other vinyl units include acrylamide, methacrylamide, N-methylacrylamide, butoxymethylacrylamide, N-propylmethacrylamide, N-vinyldiethylamine, N-acetylvinylamine, allylamine, methallylamine, N-methylallylamine, p-aminostyrene, 2-isopropenyl-oxazoline, 2-vinyl-oxazoline, 2-acroyl-oxazoline, or 2-styryl-oxazoline. These units can be used alone or in combination of two or more.

Preferred specific examples of the core-shell type rubber (G-1) in the present invention include one having a core layer of butyl acrylate polymer and the outermost layer of methyl methacrylate or methyl methacrylate/glycidyl methacrylate copolymer, one having a core layer of dimethylsiloxane/butyl acrylate copolymer and the outermost layer of methyl methacrylate or methyl methacrylate/glycidyl methacrylate copolymer, and the like.

Although the particle diameter in the core-shell type rubber (G-1) in the present invention is not particularly limited, the primary particle diameter is preferably 0.05 to 1 μm, more preferably 0.1 to 0.8 μm, and most preferably 0.2 to 0.6 μm.

In the core-shell type rubber (G-1) in the present invention, although the weight ratio of the core to the shell is not particularly limited, the amount of the core layer is preferably 50 to 95 parts by weight, more preferably 55 to 93 parts by weight, and most preferably 60 to 90 parts by weight, based on the total core-shell type rubber.

As the core-shell type rubber (G-1) in the present invention that satisfies the conditions mentioned above, commercially available products may be used, or it can also be prepared using known methods.

Examples of the commercially available products include, for example, "METABLEN" available from Mitsubishi Rayon Co., Ltd., "Kane Ace" available from Kaneka Corporation, "PARALOID" available from Rohm and Haas, "STAPHYLOID" available from Takeda Pharmaceutical Company Limited, or "Paraface" available from Kuraray Co., Ltd., and these can be used alone or in combination of two or more.

Further, in the case where the thermoplastic resin comprising polylactide resin (A) of the present invention is composed of the polylactide resin (A-1) and the thermoplastic resin other than polylactide resin (A-2), in a preferred aspect, a compatibilizer (I) can be added. The compatibilizer as used herein is capable of improving compatibility of the polylactide resin (A-1) and the thermoplastic resin other than polylactide resin (A-2) by reducing interfacial tension between these two components, thereby improving shock resistance and heat resistance.

Examples of the compatibilizer (I) in the present invention include a high molecular compound obtained by grafting or copolymerizing a glycidyl compound or an acid anhydride, a high molecular compound comprising acrylic resin units or styrene resin units by grafting, and the like, which may be used alone or in combination of two or more.

The amount of the compatibilizer (I) in the present invention is preferably 0.5 parts by weight to 30 parts by weight, more preferably 0.8 parts by weight to 25 parts by weight, and particularly preferably 1 part by weight to 20 parts by weight, based on 100 parts by weight of the thermoplastic resin comprising polylactide resin (A).

Examples of the glycidyl compound in the high molecular compound obtained by grafting or copolymerizing a glycidyl compound or an acid anhydride described above include glycidyl esters of unsaturated organic acid such as glycidyl acrylate, glycidyl methacrylate, glycidyl ethacrylate, and glycidyl itaconate; glycidyl ethers such as allyl glycidyl ether; and derivatives thereof (for example, 2-methyl glycidyl methacrylate, and the like), among which glycidyl acrylate and glycidyl methacrylate can be preferably used, and these can be used alone or in combination of two or more.

Preferred examples of acid anhydrides include maleic anhydride and the like.

The amount of the glycidyl compound or acid anhydride in grafting or copolymerization into a high molecular compound, although not particularly limited, is preferably 0.05 to 20% by weight and more preferably 0.1 to 15% by weight based on the high molecular compound.

The high molecular compound obtained by grafting or copolymerizing a glycidyl compound or an acid anhydride is, although not limited to, a high molecular compound comprising acrylonitrile/styrene, vinyl copolymer, polyamide resin and polyester resin, and the like and the glycidyl compound or acid anhydride described above by grafting or copolymerization, and it is used as one or two or more selected from them. Specific examples thereof include acrylonitrile/styrene/glycidyl methacrylate, ethylene/propylene-g-maleic anhydride, ethylene/glycidyl methacrylate, ethylene ethyl acrylate-g-maleic anhydride, ethylene/butene-1-g-maleic anhydride, and the like. "/" as used herein represents copolymerization, and "-g-" represents grafting.

The above-described high molecular compound comprising acrylic resin units or styrene resin units by grafting is a high molecular compound comprising at least one or more acrylic resin units or styrene resin units as a branched chain of a graft copolymer, and, in this case, examples of the main chain polymer include, for example, a polyolefin, polystyrene, an acrylic resin, and a polycarbonate resin.

The polyolefin described above refers to a homopolymer of α-olefins such as ethylene, propylene, butene-1, hexene-1,3-methylbutene-1,4-methylpentene-1, heptene-1, and octene-1; a copolymer in a random or block form thereof; and a random, block, or graft copolymer of more than half the weight of these α-olefins and other unsaturated monomers, and as the other unsaturated monomer, unsaturated organic acids such as acrylic acid, methacryl acid, maleic acid, itaconic acid, methyl acrylate, ethyl acrylate, methyl methacrylate, maleic anhydride, glycidyl methacrylate, arylmaleic acid imide, and alkylmaleic acid imide or derivatives thereof; vinyl esters such as vinyl acetate and vinyl butyrate; aromatic vinyl compounds such as styrene and methylstyrene; vinylsilanes such as vinyltrimethylmethoxysilane and methacryloyloxypropyltrimethoxysilane; or unconjugated dienes such as dicyclopentadiene and 4-ethylidene-2-norbornene can be used. In the case of copolymerization, α-olefins and other monomers are not necessarily of two kinds and may be of multiple kinds.

The polystyrene described above refers to a homopolymer of styrene monomers such as styrene, methylstyrene, and glycidyl-substituted styrene; a copolymer in a random or block form thereof; and a random, block, or graft copolymer of more than half the weight of these and other unsaturated monomers, and as the other unsaturated monomer, unsaturated organic acids such as acrylic acid, methacryl acid, maleic acid, itaconic acid, methyl acrylate, ethyl acrylate, methyl methacrylate, maleic anhydride, glycidyl methacrylate, arylmaleic acid imide, and alkylmaleic acid imide or derivatives thereof; vinyl esters such as vinyl acetate and vinyl butyrate; aromatic vinyl compounds such as styrene and methylstyrene; vinylsilanes such as vinyltrimethylmethoxysilane and methacryloyloxypropyltrimethoxysilane; or unconjugated dienes such as dicyclopentadiene and 4-ethylidene-2-norbornene can be used. In the case of copolymerization, α-olefins and other monomers are not necessarily of two kinds and may be of multiple kinds.

The acrylic resin described above refers to a homopolymer of acrylic resin monomers such as acrylic acid, methacryl acid, methyl acrylate, ethyl acrylate, methyl methacrylate, and glycidyl methacrylate; a copolymer in a random or block form; and a random, block, or graft copolymer of more than half the weight of these and other unsaturated monomers, and as the other unsaturated monomer, unsaturated organic acids such as maleic acid, itaconic acid, maleic anhydride, arylmaleic acid imide, and alkylmaleic acid imide or derivatives thereof; vinyl esters such as vinyl acetate and vinyl butyrate; aromatic vinyl compounds such as styrene and methylstyrene; vinylsilanes such as vinyltrimethylmethoxysilane and methacryloyloxypropyltrimethoxysilane; or unconjugated dienes such as dicyclopentadiene and 4-ethylidene-2-norbornene can be used. In the case of copolymerization, α-olefins and other monomers are not necessarily of two kinds and may be of multiple kinds.

Examples of the polycarbonate resin described above include aromatic polycarbonate resin, aliphatic polycarbonate resin, aliphatic polyester carbonate resin, and branched (cross-linked) polycarbonate resin, and refers to a random, block, or graft copolymer of more than half the weight of these and other unsaturated monomers, and as the other unsaturated monomer, unsaturated organic acids such as acrylic acid, methacryl acid, maleic acid, itaconic acid, methyl acrylate, ethyl acrylate, methyl methacrylate, maleic anhydride, glycidyl methacrylate, arylmaleic acid imide, and alkylmaleic acid imide or derivatives thereof; vinyl esters such as vinyl acetate and vinyl butyrate; aromatic vinyl compounds such as styrene and methylstyrene; vinylsilanes such as vinyltrimethylmethoxysilane and methacryloyloxypropyltrimethoxysilane; or unconjugated dienes such as dicyclopentadiene and 4-ethylidene-2-norbornene can be used. In the case of copolymerization, α-olefins and other monomers are not necessarily of two kinds and may be of multiple kinds.

The acrylic resin to be introduced by grafting is a polymer obtained by polymerization of (meth)acrylic acid ester monomers or copolymerization of (meth)acrylic acid ester monomers and monomers that are copolymerizable therewith, and examples of (meth)acrylic acid ester monomers include esters of (meth)acrylic acid and $C_1$-$C_{12}$ alcohols, specifically, methyl (meth)acrylate, ethyl (meth)acrylate, propyl (meth) acrylate, n-butyl (meth)acrylate, isobutyl (meth)acrylate, t-butyl (meth)acrylate, 2-ethylhexyl (meth)acrylate, octyl (meth)acrylate, and the like. In particular, those obtained by polymerization of methyl methacrylate alone (hereinafter referred to as PMMA) or a mixture of methyl methacrylate and other copolymerizable vinyl or vinylidene monomers are preferred, and more preferred are those which contain 80% by weight or more of methyl methacrylate. Preferred examples of other copolymerizable vinyl or vinylidene monomers include $C_1$-$C_8$ alkyl acrylate esters such as methyl acrylate, ethyl acrylate, butyl acrylate, and 2-ethylhexyl acrylate, glycidyl acrylate, glycidyl methacrylate, maleic anhydride, styrene, and acrylonitrile. The acrylic resin to be introduced is not necessarily of one kind and can be of multiple kinds.

As a styrene resin to be introduced by grafting, styrene alone (hereinafter referred to as PS) or copolymer of styrene and acrylonitrile (hereinafter referred to as AS) is preferably used.

Specific examples of the high molecular compound comprising acrylic resin units or styrene resin units by grafting include polyethylene-g-polymethyl methacrylate (PE-g-PMMA), polypropylene-g-polymethyl methacrylate (PP-g-PMMA), poly(ethylene/propylene)-g-polymethyl methacrylate (E/PM-g-PMMA), poly(ethylene/ethyl acrylate)-g-polymethyl methacrylate (E/EA-g-PMMA), poly(ethylene/vinyl acetate)-g-polymethyl methacrylate (E/VA-g-PMMA), poly(ethylene/ethyl acrylate/maleic anhydride)-g-polymethyl methacrylate (E/EA/MAH-g-PMMA), poly(ethylene/gcidyl methacrylate)-g-polymethyl methacrylate (E/GMA-g-PMMA), poly(ethyl acrylate/glycidyl methacrylate)-g-polymethyl methacrylate (EA/GMA-g-PMMA), polycarbonate-g-polymethyl methacrylate (PC-g-PMMA), polycarbonate-g-polymethyl methacrylate/glycidyl methacrylate (PC-g-PMMA/GMA), polyethylene-g-polystyrene (PE-g-PS), polypropylene-g-polystyrene (PP-g-PS), poly(ethylene/propylene)-g-polystyrene (E/PM-g-PS), poly(ethylene/ethyl acrylate)-g-polystyrene (E/EA-g-PS), poly(ethylene/vinyl acetate)-g-polystyrene (E/VA-g-PS), poly(ethylene/ethyl acrylate/maleic anhydride)-g-polystyrene (E/EA/MAH-g-PS), poly(ethylene/glycidyl methacrylate)-g-polystyrene (E/GMA-g-PS), poly(ethyl acrylate/glycidyl methacrylate)-g-polystyrene (EA/GMA-g-PS), polycarbonate-g-polystyrene (PC-g-PS), polycarbonate-g-polystyrene/maleic anhydride (PC-g-PS/MAH), polycarbonate-g-polystyrene/glycidyl methacrylate (PC-g-PS/GMA), polyethylene-g-AS (PE-g-AS), polypropylene-g-AS (PP-g-AS), poly(ethylene/propylene)-g-AS (E/PM-g-AS), poly(ethylene/ethyl acrylate)-g-AS (E/EA-g-AS), poly(ethylene/vinyl acetate)-g-AS (E/VA-g-AS), poly(ethylene/ethyl acrylate/maleic anhydride)-g-AS(E/EA/MAH-g-AS), poly(ethylene/glycidyl methacrylate)-g-AS (E/GMA-g-AS), poly(ethyl acrylate/glycidyl methacrylate)-g-AS (EA/GMA-g-AS), polycarbonate-g-AS (PC-g-AS), polycarbonate-g-AS/maleic anhydride (PC-g-AS/MAH), polycarbonate-g-AS/glycidyl methacrylate (PC-g-AS/GMA), and the like.

As the other compatibilizer (I), polymethyl methacrylate-g-polyester, methyl methacrylate/glycidyl methacrylate-g-polyester, and the like can also be suitably used.

In the case where the thermoplastic resin other than polylactide resin (A-2) is a polycarbonate resin, preferred specific examples of the compatibilizer (I) include polyethylene/glycidyl methacrylate, methyl methacrylate/glycidyl methacrylate-g-polyester, poly(ethylene/glycidyl methacrylate)-g-polymethyl methacrylate (E/GMA-g-PMMA), poly(ethylene/glycidyl methacrylate)-g-polystyrene (E/GMA-g-PS), poly(ethylene/glycidyl methacrylate)-g-AS (E/GMA-g-AS), polycarbonate-g-polymethyl methacrylate (PC-g-PMMA), polycarbonate-g-poly(methyl methacrylate/glycidyl methacrylate) (PC-g-PMMA/GMA), polycarbonate-g-polystyrene (PC-g-PS), polycarbonate-g-polystyrene/maleic anhydride (PC-g-PS/MAH), polycarbonate-g-polystyrene/glycidyl methacrylate (PC-g-PS/GMA), polycarbonate-g-AS (PC-g-AS), polycarbonate-g-AS/maleic anhydride (PC-g-AS/MAH), polycarbonate-g-AS/glycidyl methacrylate (PC-g-AS/GMA), and the like. More preferred specific examples include polyethylene/glycidyl methacrylate, methyl methacrylate/glycidyl methacrylate-g-polyester, poly(ethylene/glycidyl methacrylate)-g-polymethyl methacrylate (E/GMA-g-PMMA), polycarbonate-g-poly(methyl methacrylate/glycidyl methacrylate) (PC-g-PMMA/GMA), and the like.

Further, flame retardants other than the flame retardant (B) and the condensed phosphate ester (H) can be added to the thermoplastic resin composition of the present invention from the standpoint of high improvement in flame retardancy. Flame retardants other than the flame retardant (B) and the condensed phosphate ester (H) that can be contained in the thermoplastic resin composition of the present invention are not particularly limited as long as they are a flame retardant other than the flame retardant (B) and the condensed phosphate ester (H) and a substance added in order to impart flame retardancy to the resin, and specific example thereof include bromine flame retardants, phosphorus flame retardants other than the flame retardant (B) and the condensed phosphate ester (H), nitrogen compound flame retardants, silicone flame retardants, and other inorganic flame retardants, at least one or more of which can be selected and used.

Specific examples of the bromine flame retardant suitably used in the present invention include decabromodiphenyl oxide, octabromodiphenyl oxide, tetrabromodiphenyl oxide, tetrabromophthalic anhydride, hexabromocyclododecane, bis(2,4,6-tribromophenoxy)ethane, ethylenebistetrabromophthalimide, hexabromobenzene, 1,1-sulfonyl[3,5-dibromo-4-(2,3-dibromopropoxy)]benzene, polydibromophenylene oxide, tetrabromobisphenol-S, tris(2,3-dibromopropyl-1) isocyanurate, tribromophenol, tribromophenyl allyl ether, tribromoneopentyl alcohol, brominated polystyrene, brominated polyethylene, tetrabromobisphenol-A, tetrabromobisphenol-A derivatives, tetrabromobisphenol-A-epoxy oligomer or polymer, tetrabromobisphenol-A-carbonate oligomer or polymer, brominated epoxy resins such as brominated phenol novolac epoxy, tetrabromobisphenol-A-bis(2-hydroxydiethyl ether), tetrabromobisphenol-A-bis(2,3-dibromopropyl ether), tetrabromobisphenol-A-bis(allyl ether), tetrabromocyclooctane, ethylenebispentabromodiphenyl, tris(tribromoneopentyl) phosphate, poly(pentabromobenzyl polyacrylate), octabromotrimethylphenyl indan, dibromoneopentyl glycol, pentabromobenzyl polyacrylate, dibromocresyl glycidyl ether, N,N'-ethylene-bis-tetrabromophthalimide, and the like. Among them, tetrabromobisphenol-A-epoxy oligomer, tetrabromobisphenol-A-carbonate oligomer, and brominated epoxy resin are preferred.

The phosphorus flame retardant other than the flame retardant (B) and the condensed phosphate ester (H) suitably used in the present invention is not particularly restricted as long as it is a phosphorus flame retardant other than the flame retardant (B) and the condensed phosphate ester (H), and representative examples thereof include organic phosphorus compounds such as phosphate esters other than the condensed phosphate ester (H) and polyphosphate other than the flame retardant (B) and red phosphorus.

Specific examples of phosphate esters other than the condensed phosphate ester (H) in the above-described organic phosphorus compound include trimethyl phosphate, triethyl phosphate, tributyl phosphate, tri(2-ethylhexyl)phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyl diphenyl phosphate, xylenyl diphenyl phosphate, diphenyl(2-ethylhexyl)phosphate, di(isopropylphenyl)phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, triphenylphosphine oxide, tricresylphosphine oxide, diphenyl methanephosphonate, diethyl phenylphosphonate, and the like.

Further examples include the phosphate and polyphosphate comprising salts derived from phosphoric acid and polyphosphoric acid, and metals of group IA to group IVB of the periodic table, ammonia, aliphatic amines other than piperazine, and aromatic amines other than melamine. Examples of representative salts of polyphosphate include metal salts such as lithium salt, sodium salt, calcium salt, barium salt, iron (II) salt, iron (III) salt, and aluminum salt; aliphatic amine salts other than piperazine salt such as methylamine salt, ethylamine salt, diethylamine salt, triethylamine salt, and ethylenediamine salt; and aromatic amine salts other than melamine salt such as pyridine salt and triazine salt.

Examples other than the above include halogen-containing phosphate esters such as trischloroethyl phosphate, trisdichloropropyl phosphate, and tris(O-chloropropyephosphate), phosphazene compounds having a structure in which a phosphorus atom a nitrogen atom are double bonded, and phosphate ester amides.

As red phosphorus, not untreated red phosphorus alone but red phosphorus treated with one or more compound coatings selected from the group consisting of thermosetting resin coating, metal hydroxide coating, and metal plating can be preferably used. The thermosetting resin for thermosetting resin coating is not particularly restricted as long as it is a resin that is able to cover red phosphorus, and examples thereof include phenol-formalin resin, urea-formalin resin, melamine-formalin resin, alkyd resin, and the like. The metal hydroxide for metal hydroxide coating is not particularly restricted as long as it is able to cover red phosphorus, and examples thereof include aluminum hydroxide, magnesium hydroxide, zinc hydroxide, titanium hydroxide, and the like. The metal for metal plating is not particularly restricted as long as it is able to cover red phosphorus, and examples thereof include, for example, Fe, Ni, Co, Cu, Zn, Mn, Ti, Zr, Al, or alloys thereof. Further, two or more of these coatings may be combined, or two or more of them may be laminated.

Examples of the nitrogen compound flame retardant suitably used in the present invention include aliphatic amine compounds, aromatic amine compounds, nitrogen-containing heterocyclic compounds, cyanide compounds, aliphatic amides, aromatic amides, urea, thiourea, and the like. However, nitrogen-containing phosphorus flame retardants such as ammonium polyphosphate as exemplified for the phosphorus flame retardant described above are not included in the nitrogen compound flame retardant as used herein. Examples of aliphatic amines include ethylamine, butylamine, diethylamine, ethylenediamine, butylenediamine, triethylenetetramine, 1,2-diaminocyclohexane, 1,2-diaminocyclooctane, and the like. Examples of aromatic amines include aniline, phenylenediamine, and the like. Examples of nitrogen-containing heterocyclic compounds include uric acid, adenine, guanine, 2,6-diaminopurine, 2,4,6-triaminopyridine, triazine compounds, and the like. Examples of cyanide compounds include dicyandiamide and the like. Examples of aliphatic amides include N,N-dimethylacetamide and the like. Examples of aromatic amides include N,N-diphenyl acetamide and the like.

The triazine compounds exemplified above is a nitrogen-containing heterocyclic compound having a triazine skeleton, and examples thereof include triazine, melamine, benzoguanamine, methyl guanamine, cyanuric acid, melamine cyanurate, melamine isocyanurate, trimethyltriazine, triphenyltriazine, ammeline, ammelide, thiocyanuric acid, diamino mercaptotriazine, diamino methyltriazine, diamino phenyltriazine, diamino isopropoxy triazine, and the like.

Preferred examples of melamine cyanurate or melamine isocyanurate include adducts of cyanuric acid or isocyanuric acid with a triazine compound, the adducts having a composition of, generally, 1:1 (molar ratio) or, optionally, 1:2 (molar ratio). They are prepared by known methods; for example, a mixture of melamine and cyanuric acid or isocyanuric acid is made into water slurry, which is well mixed to form a salt of the both in the form of fine particles, and then this slurry is filtered and dried, after which an adduct is obtained generally as a powder. The above-described salt need not necessarily be completely pure, and some unreacted melamine, or cyanuric acid or isocyanuric acid may remain. The mean diameter before addition to resin is preferably 100 to 0.01 µm and more preferably 80 to 1 µm in terms of the flame retardancy, mechanical strength, and surface properties of molded articles.

Among the nitrogen compound flame retardants, nitrogen-containing heterocyclic compounds are preferred. Triazine compounds are particularly preferred; and melamine cyanurate is still more preferred.

In cases where the nitrogen compound flame retardant described above has poor dispersibility, dispersants such as tris(β-hydroxyethyl)isocyanurate and known surface treatments such as polyvinyl alcohol and metal oxide may be used in combination.

Examples of the silicone flame retardant suitably used in the present invention include silicone resins and silicone oil. Examples of the silicone resins described above include resins having a three-dimensional net-like structure composed of combined structure units of $SiO_2$, $RSiO_{3/2}$, $R_2SiO$, and $R_3SiO_{1/2}$. R represents an alkyl group such as methyl, ethyl, or propyl; an aromatic group such as phenyl or benzyl; or the substituents described above containing a vinyl group therein. Examples of the silicone oil described above include polydimethylsiloxane; modified polysiloxane obtained by modifying at least one methyl group of the side chain or terminal of polydimethylsiloxane with at least one group selected from hydrogen element, alkyl, cyclohexyl, phenyl, benzyl, amino, epoxy, polyether, carboxyl, mercapto, chloroalkyl, alkyl higher alcohol ester, alcohol, aralkyl, vinyl, and trifluoromethyl; or an mixtures thereof. Further, when the thermoplastic resin other than polylactide resin (A-2) is a polycarbonate resin, a resin obtained by copolymerizing the polycarbonate resin (A-2) with silicone compounds such as a silicone resin and polydimethylsiloxane may be used.

Examples of the other inorganic flame retardant suitably used in the present invention include magnesium hydroxide, aluminum hydroxide, antimony trioxide, antimony pentoxide, sodium antimonate, hydroxy zinc stannate, zinc stannate, metastannic acid, tin oxide, tin oxide salt, zinc sulfate, zinc oxide, ferrous oxide, ferric oxide, stannous oxide, stannic oxide, zinc borate, calcium borate, ammonium borate, ammonium octamolybdate, metal salts of tungstic acid, complex oxide acid of tungsten and metalloid, ammonium sulfamate, graphite, swellable graphite, and the like. Among them, aluminum hydroxide, zinc borate, and swellable graphite are preferred.

The flame retardant other than the flame retardant (B) and the condensed phosphate ester (H) in the present invention may be used alone or in combination of two or more.

When flame retardants other than the flame retardant (B) and the condensed phosphate ester (H) is added to the thermoplastic resin composition of the present invention, the amount thereof is preferably 0.1 to 50 parts by weight, more preferably 0.5 to 40 parts by weight, and most preferably 1 to 30 parts by, weight based on 100 parts by weight of the thermoplastic resin comprising polylactide resin (A).

In a preferred aspect, inorganic fillers can also be contained in the thermoplastic resin composition of the present invention. Examples of inorganic fillers include those of plate form, granular form, and powder form; inorganic fillers that can be dispersed uniformly in the thermoplastic resin comprising polylactide resin (A) are preferred, and impalpable powder of silica minerals, silicate minerals, and various minerals obtained by processing such as pulverization is preferably used. Specific examples thereof include bentonite, dolomite, barite, finely divided hydrated silica, aluminum silicate, dawsonite, Shirasu balloon, sericite, feldspar powder, glass flakes, glass beads, graphite, metal foil, ceramic beads, potassium titanate, gypsum, novaculite, white clay, hydrotalcite, and the like.

The inorganic fillers described above cause less reduction in mechanical properties particularly when the mean diameter is not more than 10 µm, more preferably not more than 5 µm. In terms of handleability during production, the lower limit of the mean diameter is preferably not less than 0.5 µm, and the mean diameter is more preferably not less than 0.8 µm. The mean diameter is defined as the mean particle diameter at 50% cumulative distribution measured by the laser diffraction scattering method.

When inorganic fillers are added to the thermoplastic resin composition of the present invention, the amount of the inorganic fillers is preferably 0.5 parts by weight to 30 parts by weight, more preferably 0.8 parts by weight to 25 parts by weight, and most preferably 1 part by weight to 20 parts by weight, based on 100 parts by weight of the thermoplastic resin comprising polylactide resin (A).

To the thermoplastic resin composition of the present invention, epoxy compounds other than the plasticizer (F) and the compatibilizer (I) can be further added. Although the epoxy compound is not particularly restricted and may be a monofunctional epoxy compound or a bi- or more functional epoxy compound, it is preferably an epoxy compound having a glycidyl group, examples of which include glycidyl ester compounds, glycidyl ether compounds, and glycidyl ester ether compounds. One or more these epoxy compounds can be used. Specific examples of the glycidyl ester compounds described above include, but are not limited to, benzoic acid glycidyl ester, tert-butyl-benzoic acid glycidyl ester, p-toluic acid glycidyl ester, cyclohexane carboxylic acid glycidyl ester, pelargonic acid glycidyl ester, stearic acid glycidyl ester, lauric acid glycidyl ester, palmitin acid glycidyl ester, behenic acid glycidyl ester, versatic acid glycidyl ester, oleic acid glycidyl ester, linoleic acid glycidyl ester, linolenic acid glycidyl ester, behenolic acid glycidyl ester, stearolic acid glycidyl ester, terephthalic acid diglycidyl ester, isophthalic acid diglycidyl ester, phthalic acid diglycidyl ester, naphthalene dicarboxylic acid diglycidyl ester, bibenzoic acid diglycidyl ester, methyl terephthalic acid diglycidyl ester, hexahydrophthalic acid diglycidyl ester, tetrahydrophthalic acid diglycidyl ester, cyclohexanedicarboxylic acid diglycidyl ester, adipic acid diglycidyl ester, succinic acid diglycidyl ester, sebacic acid diglycidyl ester, dodecanedioic acid diglycidyl ester, octadecane dicarboxylic acid diglycidyl ester, trimellitic acid triglycidyl ester, pyromellitic acid tetraglycidyl ester, and the like, which can be used alone or in combination of two or more.

Specific examples of the glycidyl ether compounds described above include, but are not limited to, for example, phenyl glycidyl ether, p-phenylphenyl glycidyl ether, and diglycidyl ether obtained by the reaction between epichlorohydrin and other bisphenols such as 1,4-bis(β,γ-epoxypropoxy)butane, 1,6-bis(β,γ-epoxypropoxy)hexane, 1,4-bis(β,γ-epoxypropoxy)benzene, 1-(β,γ-epoxypropoxy)-2-ethoxyethane, 1-(β,γ-epoxypropoxy)-2-benzyloxyethane, 2,2-bis-[p-(β,γ-epoxypropoxy)phenyl]propane, and bis-(4-hydroxyphenyl)methane, which can be used alone or in combination of two or more.

Examples of other epoxy compounds having an glycidyl group include tris(2,3-epoxypropyl)isocyanurate and the like.

For an epoxy equivalent weight of the epoxy compound described above, an epoxy compound of less than 500 is preferred, and, further, an epoxy compound having an epoxy equivalent weight of less than 400 is particularly preferred. Epoxy equivalent weight as used herein refers to the weight of an epoxy compound, in grams, that contains one equivalent of epoxy groups, and it can be determined by the method involving dissolution of an epoxy compound in pyridine, addition of 0.05 N hydrochloric acid, heating at 45° C., followed by back-titration with 0.05 N caustic soda using as an indicator a mixed solution of thymol blue and cresol red.

The epoxy compound described above has a significant effect in improving the hydrolysis resistance of the polylactide resin (A-1) without impairing viscosity stability and mechanical properties, and, from the standpoint of viscosity stability and hydrolysis resistance, the amount of the epoxy compound is preferably 0.01 to 10 parts by weight, more preferably 0.05 to 9 parts by weight, and most preferably 0.1 to 8 parts by weight, based on 100 parts by weight of the thermoplastic resin comprising polylactide resin (A).

Examples of methods of adding the epoxy compound described above include, in producing the thermoplastic resin composition of the present invention, charging into a heating melt-kneading machine such as an extruder together with the polylactide resin (A-1) and the thermoplastic resin other than polylactide resin (A-2), heating and melt-kneading, in advance, the polylactide resin (A-1) and the epoxy compound described above with a heating melt-kneading machine such as an extruder and then heating and melt-kneading the resultant with the thermoplastic resin other than polylactide resin (A-2), and the like.

In the thermoplastic resin composition of the present invention, alkaline earth metal compounds can be further contained, and preferred examples of alkaline earth metal compounds include alkaline earth metal compounds such as magnesium compounds, calcium compounds, and barium compounds. Examples of the alkaline earth metal compounds described above include hydroxides, carbonates, sulfates, acetates, lactates, and organic acid salts such as oleinate, palmitate, stearate, and montanate of alkaline earth metals. Specific examples of the alkaline earth metal compounds described above include, for example, magnesium hydroxide, calcium hydroxide, barium hydroxide, magnesium carbonate, calcium carbonate, barium carbonate, magnesium sulfate, calcium sulfate, barium sulfate, magnesium acetate, calcium acetate, barium acetate, magnesium lactate, calcium lactate, barium lactate, and, further, magnesium salts, calcium salts, and barium salts of organic acids such as oleic acid, palmitin acid, stearic acid, and montanic acid. Among them, hydroxides and carbonates of alkaline earth metals are preferably used; in particular, magnesium hydroxide and calcium carbonate are preferably used, and calcium carbonate is more preferably used. Such alkaline earth metals can be used alone or in combination of two or more. As the calcium carbonate described above, depending on the preparation method, colloid calcium carbonate, precipitated calcium carbonate, heavy calcium carbonate, wet finely-crushed heavy calcium carbonate, wet heavy calcium carbonate (chalk), and the like are known, all of which are encompassed within calcium carbonate. These alkaline earth metal compounds may be treated with one or more surface treatments such as silane coupling agents, organic matter, and inorganic matter. Although the form may be powdery, platelike, or fibrous, they are preferably used in the form of powder with a mean diameter of not more than 10 μM in terms of dispersibility and the like. Even smaller particle diameter increases hydrolysis resistance-improving effect, which is preferred.

The effect of the addition of the alkaline earth metal compounds described above is presumably as follows: flame retardants, particularly phosphorus flame retardants, are prone to hydrolysis and therefore adversely affect the hydrolysis resistance of a polylactic acid resin, but, by adding an alkaline earth metal compound and an epoxy compound in combination, the alkaline earth metal compound neutralizes the phosphoric acid generated from the hydrolyzed phosphorus flame retardant described above, thereby further improving hydrolysis resistance. When alkali metal compounds are used in place of alkaline earth metal compounds, alkali metal compounds are alkaline in most cases and generally promote hydrolysis of a polylactic acid resin, which is not preferred. As the alkaline earth metal compounds described above, those which are poorly water-soluble in the neutral state and dissolve under acidic environment to exhibit a neutralizing action when phosphate esters have broken down to acidify the system are preferably used. The solubility in the neutral state is described, for example, in handbooks such as The Chemical Society of Japan eds. (1966) "Chemical handbook" published by MARUZEN PUBLISHING CO., LTD., and the solubility in water is preferably 1 g/100 g water or lower, and more preferably $10^{-1}$ g/100 g water or lower. The solubility in water of calcium carbonate most preferably used is $5.2 \times 10^{-3}$ g/100 g water.

The amount of alkaline earth metal compounds is 0.01 to 10 parts by weight, preferably 0.05 to 9 parts by weight, and more preferably 0.1 to 8 parts by weight, based on 100 parts by weight of the thermoplastic resin comprising polylactide resin (A), from the standpoint of mechanical properties and hydrolysis resistance.

In the thermoplastic resin composition of the present invention, fibrous reinforcements can be further contained, thereby allowing the improvement of heat resistance, particularly heat distortion temperature.

As the fibrous reinforcements described above, those which are commonly used to reinforce thermoplastic resins can be used. Specific examples thereof include inorganic fibrous reinforcements such as glass fibers, asbestos fibers, carbon fibers, graphite fibers, metal fibers, potassium titanate whiskers, aluminum borate whiskers, magnesium whiskers, silicon whiskers, wollastonite, sepiolite, asbestos, slag fibers, zonolite, ellestadite, gypsum fibers, silica fibers, silica/alumina fibers, zirconia fibers, boron nitride fibers, silicon nitride fibers, and boron fibers; and organic fibrous reinforcements such as polyester fibers, nylon fibers, acryl fibers, regenerated cellulose fibers, acetate fibers, kenaf, bamboo, ramie, cotton, jute, hemp, sisal, flax, linen, silk, Manila hemp, sugar cane, wood pulp, wastepaper, used paper, and wool. Among these fiber reinforcements, inorganic fibrous reinforcements are preferred, and, in particular, glass fibers, aluminum borate whiskers, and wollastonite are preferred. The use of organic fibrous reinforcements is also preferred; natural fibers and regenerated fibers are more preferred from the standpoint of making use of the biodegradability of the polylactide resin (A-1), and kenaf and used paper are particularly preferred. The aspect ratio (average fiber length/average fiber diameter) of the fibrous reinforcements to be added is preferably 5 or more, more preferably 10 or more, and most preferably 20 or more from the standpoint of improving heat distortion temperature.

The fibrous reinforcements described above may be coated or bundled with a thermoplastic resin such as ethylene/vinyl acetate copolymer or a thermosetting resin such as an epoxy resin, or may be treated, for example, with a coupling agent such as aminosilane or epoxysilane.

The amount of the fibrous reinforcements described above is preferably 0.1 to 200 parts by weight, and more preferably 0.5 to 100 parts by weight, based on 100 parts by weight of the thermoplastic resin comprising polylactide resin (A).

To the thermoplastic resin composition of the present invention, layer silicate can be further added, thereby allowing the improvement of moldability. For the layer silicate described above, it is more preferable to add layer silicate in which exchangeable cations that exists between layers have been exchanged for organic onium ions. Layer silicate in which exchangeable cations that exists between layers have been exchanged for organic onium ions is a clathrate compound in which exchangeable cations in layer silicate having exchangeable cations between layers are replaced with organic onium ions.

The layer silicate having exchangeable cations between layers has a laminated structure of plates having a width of 0.05 to 0.5 μm and a thickness of 6 to 15 Angstrom and has exchangeable cations between the layers of the plates. The cation exchange capacity is, for example, 0.2 to 3 meq/g, and those having a cation exchange capacity of 0.8 to 1.5 meq/g is preferred.

Specific examples of the layer silicate described above include, for example, smectite clay minerals such as montmorillonite, beidellite, nontronite, saponite, hectorite, and sauconite; various clay minerals such as vermiculite, halloysite, kanemite, kenyaite, zirconium phosphate, and titanium phosphate; and swellable mica such as Li-fluor-taeniolite, Na-fluor-taeniolite, Na-tetrasilicic fluormica, and Li-tetrasilicic fluormica, which may be natural or synthetic. Among them, smectite clay minerals such as montmorillonite and hectorite and swellable synthetic mica such as Na-tetrasilicic fluormica and Li-fluor-taeniolite are preferred.

Examples of the organic onium ions described above include ammonium ions, phosphonium ions, sulfonium ions, and the like. Among them, ammonium ions and phosphonium ions are preferred, and, particularly, ammonium ions are preferable used. Ammonium ions may be any of primary ammonium, secondary ammonium, tertiary ammonium, and quarternary ammonium, and examples of primary ammonium ions include decylammonium, dodecylammonium, octadecylammonium, oleylammonium, benzylammonium, and the like; examples of secondary ammonium ions include methyldodecylammonium, methyloctadecylammonium, and the like; examples of tertiary ammonium ions include dimethyldodecylammonium, dimethyloctadecylammonium, and the like; and examples of quarternary ammonium ions include benzyltrialkylammonium ions such as benzyltrimethylammonium, benzyltriethylammonium, benzyltributylammonium, benzyldimethyldodecylammonium, benzyldimethyloctadecylammonium, and benzalkonium; alkyltrimethylammonium ions such as trimethyloctylammonium, trimethyldodecylammonium, and trimethyloctadecylammonium; dimethyldialkylammonium ions such as dimethyldioctylammonium, dimethyldidodecylammonium, and dimethyldioctadecylammonium; trialkylmethylammonium ions such as trioctylmethylammonium and tridodecylmethylammonium; benzethonium ion having two benzene rings; and the like. In addition to them, examples also include ammonium ions derived, for example, from aniline, p-phenylenediamine, α-naphthylamine, p-aminodimethylaniline, benzidine, pyridine, piperidine, 6-aminocaproic acid, 11-aminoundecanoic acid, 12-aminododecanoic acid, and polyalkylene glycol having an amino group at a terminal. Among these ammonium ions, preferred compounds are trioctylmethylammonium, benzyldimethyldodecylammonium, benzyldimethyloctadecylammonium, benzalkonium, and the like. These ammonium ions are generally available as a mixture, and the names of the compounds described above are the name of representative compounds including a small amount of analogs. These may be used alone or may be used as a mixture of two or more.

Further, those having a reactive functional group and those having high affinity are preferred, and ammonium ions derived, for example, from 12-aminododecanoic acid and polyalkylene glycol having an amino group at the terminal and the like are also preferred.

The above-described layer silicate in which exchangeable cations that exists between layers have been exchanged for organic onium ions can be produced by reacting layer silicate having exchangeable cations between layers with organic onium ions using a known method. Specific examples of the method include a method using ion-exchange reaction in a polar solvent such as water, methanol, or ethanol, a method using direct reaction of layer silicate with liquid or melted ammonium salts, and the like.

In terms of, for example, dispersibility, thermal stability during melting, and reduction of gas and odor generation during molding of the layer silicate, the amount of the organic onium ions relative to the layer silicate described above is generally in the range of 0.4 to 2.0 equivalents but preferably 0.8 to 1.2 equivalents relative to the cation exchange capacity of the layer silicate.

For obtaining more excellent mechanical strength, it is preferable to use the layer silicate described above after being pretreated with a coupling agent having a reactive functional group as well as with the above-described organic onium salt. Examples of such a coupling agent having a reactive functional group include isocyanate compounds, organic silane compounds, organic titanate compounds, organic borane compounds, epoxy compounds, and the like.

When the layer silicate described above is added to the thermoplastic resin composition of the present invention, the amount thereof is preferably 0.1 to 40 parts by weight, more preferably 0.5 to 30 parts by weight, and particularly preferably 1 to 20 parts by weight, based on 100 parts by weight of the thermoplastic resin comprising polylactide resin (A).

In the thermoplastic resin composition of the present invention, at least one of carbon black, titanium oxide, colcothar, ultramarine blue, calcined yellow, and further pigments and dyes of various colors can be further contained, thereby toning the color of the resin variously and also improving weather (light) resistance and conductivity.

When the pigments and dyes described above are added to the thermoplastic resin composition of the present invention, the amount thereof is advantageously 0.01 to 10 parts by weight, preferably 0.02 to 9 parts by weight, and more preferably 0.03 to 8 parts by weight, based on 100 parts by weight of the thermoplastic resin comprising polylactide resin (A).

Examples of the carbon black described above include, but are not limited to, channel black, furnace black, acetylene black, anthracene black, lampblack, pine soot, and graphite, and a carbon black with a mean diameter of 500 nm or less and a dibutyl phthalate absorption of 50 to 400 $cm^3/100$ g is preferably used, which may be treated with a treating agent such as aluminum oxide, silicon oxide, zinc oxide, zirconium oxide, polyol, or a silane coupling agent.

As the titanium oxide described above, titanium oxide having a crystal form such as rutile form or anatase form and an mean particle diameter of 5 μm or less is preferably used, and it may be treated with a treating agent such as aluminum oxide, silicon oxide, zinc oxide, zirconium oxide, polyol, or a silane coupling agent. The carbon black, titanium oxide, and pigments and dyes of various colors described above may be used as a mixed material obtained by melt-blending or simply blending them with various thermoplastic resins in order to improve dispersibility in the thermoplastic resin composition of the present invention and to improve the handleability during production. In particular, as the thermoplastic resin described above, polyester resins such as a polylactic acid resin are preferred, and a polylactic acid resin is particularly preferably used.

Further, carbodiimide compounds can also be added to the thermoplastic resin composition of the present invention from the standpoint of improving the hydrolysis resistance of the polylactide resin (A-1). As a carbodiimide compound, it is preferable to use at least one compound selected, for example, from carbodiimide compounds such as N,N'-di-2,6-diisopropylphenyl carbodiimide, 2,6,2',6'-tetraisopropyldiphenyl carbodiimide, and polycarbodiimide, and most preferred is polycarbodiimide. As polycarbodiimide, for example, a polymer or a copolymer using at least one selected from polyvalent isocyanate compounds is used. Specific examples of the polyvalent isocyanate include, for example, hexamethylene diisocyanate, xylene diisocyanate, cyclohexane diisocyanate, pyridine diisocyanate, 2,4-tolylene diisocyanate, 2,6-tolylene diisocyanate, 4,4-diphenylmethane diisocyanate, p-phenylene diisocyanate, m-phenylene diisocyanate, 1,5-naphthylene diisocyanate, and the like.

The amount the carbodiimide compounds described above is preferably 0.01 to 10 parts by weight, more preferably 0.05 to 9 parts by weight, and most preferably 0.1 to 8 parts by weight, based on 100 parts by weight of the thermoplastic resin comprising polylactide resin (A).

To the thermoplastic resin composition of the present invention, stabilizers (such as hindered phenol antioxidants, phosphorus antioxidants, amine antioxidants, sulfur antioxidants, light stabilizers, UV absorbers, and copper inhibitors), mold release agents (fatty acid, fatty acid metal salts, oxy fatty acid, fatty acid esters, aliphatic partially saponified esters, paraffin, low-molecular-weight polyolefins, fatty acid amides, alkylene bis-fatty acid amides, aliphatic ketones, fatty acid lower alcohol esters, fatty acid polyhydric alcohol esters, fatty acid polyglycol esters, modified silicone), and the like can be further added as required to the extent that the object of the present invention is not impaired.

Although the method of producing the thermoplastic resin composition of the present invention is not particularly restricted, a production method using a heating melt-kneading machine such as an extruder or a kneader is preferably used, and more preferred is a production method using an extruder. Examples of extruders include a single-screw extruder, a twin-screw extruder, a triple- or multiple-screw extruder, a twin/single composite extruder, and the like, and a twin-screw extruder is preferred in terms of kneadability and convenience.

Examples of the preferred production method include a method in which the polylactide resin (A-1), optionally the thermoplastic resin other than polylactide resin (A-2), the flame retardant (B), and other additives as required are supplied to a melt-kneading machine such as an extruder, simultaneously fed through a material feed inlet of the melt-kneading machine, and heated and melt-kneaded; a method in which materials are separately fed through a side feeder attached to a melt-kneading machine and heated and melt-kneaded; and the like.

Although the melt-kneading temperature described above is not particularly restricted as long as the thermoplastic resin comprising polylactide resin (A) used in the present invention melts, it is preferably 150° C. to 300° C., more preferably 160° C. to 290° C., and still more preferably 170° C. to at 280° C.

The thermoplastic resin composition of the present invention can be utilized by processing it into various product shapes using methods such as extrusion molding, injection molding, blow molding, and spinning into various fibers such as undrawn yarn, draw yarn, and ultradrawn yarn. The thermoplastic resin composition of the present invention can be utilized particularly as a molded article for various applications such as machine and mechanism parts, electric and electronic parts, automotive parts, optical instruments, building/civil engineering materials, and daily necessities, and is preferably used particularly as a molded article in machine and mechanism parts, electric and electronic parts, and automotive parts.

Examples of the extrusion-molded article obtained by extrusion molding described above include extrusion-molded articles such as strands, films, inflation films, sheets, tubes, and bars of various shapes such as a round bar, and they can also be drawn for use and can be utilized by further processing them into a molded article for various applications such as machine and mechanism parts, electric and electronic parts, automotive parts, optical instruments, building components, and daily necessities.

Examples of the machine and mechanism parts described above include washing jigs, various bearings such as oilless bearings, stern bearings, and submerged bearings, motor parts, lighters, typewriters, and the like.

Examples of the electrical and electronic parts described above include housings of electrical equipment, housings of office automation equipment, various covers and housings, various gears, various cases, sensors, LED lamps, connectors, sockets, resistors, relay cases, switches, coil bobbins, capacitors, variable capacitor cases, optical pickups, radiators, various terminal boards, transformers, breakers, plugs, printed wiring boards, tuners, speakers, microphones, headphones, small motors, magnetic head bases, power modules, semiconductors, liquid crystals, FDD carriages, FDD chassis, motor brush holders, parabolic antennas, CD trays, cartridges, cassettes, sorters, AC adapters, charging stands, panel boards, outlet covers, telephone set-related parts, facsimile-related parts, copier-related parts, housings and internal parts of personal computers, housings and internal parts of CRT displays, housings and internal parts of liquid crystal displays, housing and internal parts of printers, housing and internal parts of personal digital assistances such as cellular phones and handheld mobiles, housing and internal parts of storage medium (such as CD, DVD, PD, and FDD) drives, housings and internal parts of copiers, housings and internal parts of facsimiles, VTR parts, TV parts, irons, hair dryers, rice cooker parts, microwave oven parts, acoustic parts, video cameras, parts of voice apparatus such as audio/Laser Disc (registered trademark)/compact disc, illumination parts, refrigerator parts, air conditioner parts, typewriter parts, word processor parts, housings and internal parts, for example, of electronic musical instruments, home game consoles, and portable game consoles, parabolic antennas, and the like.

Examples of the automotive parts described above include interior parts, exterior parts, and underhood parts, and, specifically, instrument panels, trims, torque control levers, safety belt parts, register blades, washer levers, window regulator handles, knobs of window regulator handles, passing light levers, sun visor brackets, console boxes, trunk covers, spare tire covers, ceiling materials, flooring materials, inner plates, sheet materials, door panels, door boards, steering wheels, rear-view mirror housings, air duct panels, window molding fasteners, speed cable liners, sun visor brackets, headrest rod holders, various motor housings, various plates, various panels, roof rails, fascias, fenders, garnish, bumpers, bumper corners, bumper skirt radiator grills, hoods, door mirror stays, spoilers, hood louvers, wheel covers, wheel covers, grill apron cover frames, lamp reflectors, lamp bezels, door handles, door panels, side-view mirror housings, B pillars, air outlet louvers, emblems, exterior trims and moldings, sliding roofs, tail lamp rims, precision machine-related parts, alternator terminals, alternator connectors, IC regulators, various valves such as an exhaust gas valve, various pipes such as fuel-related pipes, exhaust system pipes, and induction system pipes, air intake nozzle snorkels, engine cooling water joints, carburetor main bodies, carburetor spacers, exhaust gas sensors, cooling water sensors, oil temperature sensors, brake pad wear sensors, throttle position sensors, crankshaft position sensors, air flow meters, thermostat bases for air conditioners, warming hot air flow control valves, radiator grills, brush holders for radiator motors, water pump impellers, wiper motor-related parts, distributors, starter switches, starter relays, wire harnesses for transmission, window washer nozzles, air conditioner panel switch boards, coils for fuel-related electromagnetic valves, connectors for fuses, horn terminals, electric equipment part insulating plates, step motor rotors, lamp sockets, solenoid bobbins, and the like.

Examples of the optical instruments described above include related parts of microscopes, binoculars, cameras, timepieces, displays, and the like.

Blow molded articles can be utilized, after being processed by molding into shapes necessary for bellows, boots, bottles, and reducing pipes and tubes, in various applications as a molded article for, for example, machine and mechanism parts, electric and electronic parts, automotive parts, optical instruments, building components, and daily necessities.

EXAMPLES

Aspects of the present invention will now be described in more detail by way of Examples, but the present invention is not limited thereto.

The materials used to practice exemplary embodiments of the present invention will be described below.

(A-1-1) Polylactide resin: a polylactic acid resin with a D-isomer content of 1.4% and a PMMA equivalent weight average molecular weight according to GPC measurement of 160,000

(A-1-2) Polylactide resin: a polylactic acid resin with a D-isomer content of 1.4% and a PMMA equivalent weight average molecular weight according to GPC measurement of 200,000

(A-1-3) Polylactide resin: a polylactic acid resin with a D-isomer content of 4% and a PMMA equivalent weight average molecular weight according to GPC measurement of 200,000
(A-2) Polycarbonate resin: "TARFLON A1900" available from Idemitsu Kosan Co., Ltd.
(B-1-1) Melamine pyrophosphate (obtained by reaction of pyrophosphoric acid and melamine at a molar ratio of 1:1)
(B-1-2) Melamine phosphate (obtained by reaction of phosphoric acid and melamine at a molar ratio of 1:1)
(B-2-1) piperazine pyrophosphate (obtained by reaction of pyrophosphoric acid and piperazine at a molar ratio of 1:1)
(B-2-2) piperazine phosphate (obtained by reaction of phosphoric acid and piperazine at a molar ratio of 1:1)
(C-1) Talc: "P-6" available from Nippon Talc Co., Ltd.
(C-2) Zinc phenylphosphonate: "ECOPROMOTE" available from NISSAN CHEMICAL INDUSTRIES, LTD.
(C-3) Organic amide crystal nucleating agent: "SDH-005" available from FUJI KASEI Co., Ltd.
(D-1) Fluorine-based resin: acrylic-modified tetrafluoroethylene "METABLEN A3800" available from Mitsubishi Rayon Co., Ltd.
(E-1) Zinc oxide: "ZINC OXIDE I" available from SAKAI CHEMICAL INDUSTRY CO., LTD.
(F-1) Polyethylene glycol plasticizer: "Pluronic F68" available from ADEKA COPORATION
(F-2) Glycerin fatty acid ester plasticizer: "Rikemal PL-019" available from RIKEN VITAMIN CO., LTD.
(G-1-1) Glycidyl group-containing core-shell type rubber: "PARALOID EXL2314" available from Rohm and Haas
(G-1-2) Non-glycidyl group containing core-shell type rubber: "METABLEN W-341" available from Mitsubishi Rayon Co., Ltd.
(G-2) Fatty acid polyamide elastomer: "TPAE-12" available from FUJI KASEI Co., Ltd.
(G-3) Ethylene-butene-1 copolymer: "TAFMER A35070S" available from Mitsui Chemicals, Inc.
(G-4) Hydrogenated version of styrene-butadiene-styrene block copolymer: "TUFTEC H1041" available from Asahi Kasei Chemicals Corporation
(H-1) Condensed phosphate ester flame retardant: "PX-200" available from DAIHACHI CHEMICAL INDUSTRY CO., LTD.
(H-2) Condensed phosphate ester flame retardant: "FP-600" available from ADEKA COPORATION
(I-1) Compatibilizer: "Bond First E" available from Sumitomo Chemical Co., Ltd. (Other additive) Fibrous reinforcements (glass fibers): "3J948" available from Nitto Boseki Co., Ltd.

Reference Example 1

Pulverization of Flame Retardant and Mode Diameter Measurement

A (B-a) flame retardant obtained by mixing 50 parts by weight of a (B-1-1) melamine pyrophosphate and 50 parts by weight of a (B-2-1) piperazine pyrophosphate was supplied to a jet mill "CO-JET SYSTEM α-mkIV" manufactured by Seishin Enterprise Co., Ltd. to obtain a pulverized (B-b) flame retardant. The pulverized (B-b) flame retardant was dispersed in a methanol solvent in 0.03% by weight concentration and ultrasonicated for 10 minutes, and then the resultant was supplied to "SALD-2100" manufactured by Shimadzu Corporation to measure the particle size distribution; the mode diameter was 2.64 μm, and the mean diameter was 1.21 μm.

For the (B-a) flame retardant, the mode diameter was measured in the same manner as described above; the mode diameter was 6.08 μm, and the mean diameter was 3.59 μM.

Reference Example 2

Pulverization of Flame Retardant and Mode Diameter Measurement

A (B-c) flame retardant obtained by mixing 50 parts by weight of a (B-1-2) melamine phosphate and 50 parts by weight of a (B-2-2) piperazine phosphate was supplied to a jet mill "CO-JET SYSTEM α-mkIV" manufactured by Seishin Enterprise Co., Ltd. to obtain a pulverized (B-d) flame retardant. The pulverized (B-d) flame retardant was dispersed in a methanol solvent in 0.03% by weight concentration and ultrasonicated for 10 minutes, and then the resultant was supplied to "SALD-2100" manufactured by Shimadzu Corporation to measure the particle size distribution; the mode diameter was 2.85 μm, and the mean diameter was 1.45 μm.

For the (B-c) flame retardant, the mode diameter was measured in the same manner as described above; the mode diameter was 7.32 μm, and the mean diameter was 5.15 μm.

Examples 1 to 6, 8 to 30

Using the (B-b) flame retardant pulverized in <Reference Example 1>, other materials shown in Tables 1 to 6 were blended at a blending ratio shown in Tables 1 to 6, and the resulting mixture was fed through a material feed inlet of a vented twin-screw extruder "TEX30α" (manufactured by Japan Steel Works, LTD.); screw diameter: 30 mmφ, and the ratio of a screw length L to a screw diameter D, L/D, =45.5, and melt-kneaded under the conditions of preset temperature: 210° C., screw speed: 200 rpm, and feed rate: 15 kg/hr. A thermoplastic resin composition in the form of a pellet was obtained using a pelletizer, and the evaluations (1) to (6) described below were carried out.

Example 7

Using the (B-d) flame retardant pulverized in <Reference Example 2>, other materials shown in Table 2 were blended at a blending ratio shown in Table 2, and the resulting mixture was fed through a material feed inlet of a vented twin-screw extruder "TEX30α" (manufactured by Japan Steel Works, LTD.); screw diameter: 30 mmφ, and the ratio of a screw length L to a screw diameter D, L/D, =45.5, and melt-kneaded under the conditions of preset temperature: 210° C., screw speed: 200 rpm, and feed rate: 15 kg/hr. A thermoplastic resin composition in the form of a pellet was obtained using a pelletizer, and the evaluations (1) to (6) described below were carried out.

Comparative Examples 1 to 10

Using the unpulverized (B-a) flame retardant, other materials shown in Tables 7 and 8 were blended at a blending ratio shown in Tables 7 and 8, and the resulting mixture was fed through a material feed inlet of a vented twin-screw extruder "TEX30α" (manufactured by Japan Steel Works, LTD.); screw diameter: 30 mmφ, and the ratio of a screw length L to a screw diameter D, L/D, =45.5, and melt-kneaded under the conditions of preset temperature: 210° C., screw speed: 200 rpm, and feed rate: 15 kg/hr. A thermoplastic resin composition in the form of a pellet was obtained using a pelletizer, and the evaluations (1) to (6) described below were carried out.

Examples 31 to 47

Using the (B-b) flame retardant pulverized in <Reference Example 1>, other materials shown in Tables 9 to 12 were blended at a blending ratio shown in Tables 9 to 12, and the resulting mixture was fed through a material feed inlet of a vented twin-screw extruder "TEX30α" (manufactured by Japan Steel Works, LTD.); screw diameter: 30 mmϕ, and the ratio of a screw length L to a screw diameter D, L/D, =45.5, and melt-kneaded under the conditions of preset temperature: 240° C., screw speed: 200 rpm, and feed rate: 15 kg/hr. A thermoplastic resin composition in the form of a pellet was obtained using a pelletizer, and the evaluations (1) to (6) described below were carried out.

Comparative Examples 11 to 20

Using the unpulverized (B-a) flame retardant, other materials shown in Tables 13 and 14 were blended at a blending ratio shown in Tables 13 and 14, and the resulting mixture was fed through a material feed inlet of a vented twin-screw extruder "TEX30α" (manufactured by Japan Steel Works, LTD.); screw diameter: 30 mmϕ, and the ratio of a screw length L to a screw diameter D, L/D, =45.5, and melt-kneaded under the conditions of preset temperature: 240° C., screw speed: 200 rpm, and feed rate: 15 kg/hr. A thermoplastic resin composition in the form of a pellet was obtained using a pelletizer, and the evaluations (1) to (6) described below were carried out.

(1) Transmission Electronic Microscopy (Major Axis of the Largest Particle Diameter of Flame Retardant (B) in Resin Composition)

The pellet obtained was hot-air dried at 80° C. overnight and then injection molded using an injection molding machine (SG75H-MIV manufactured by Sumitomo Heavy Industries, Ltd.) at a cylinder temperature of 210° C. (Examples 1 to 30 and Comparative Examples 1 to 10) or 240° C. (Examples 31 to 47 and Comparative Examples 11 to 20) and a mold temperature of 80° C. to obtain a test piece of 127 mm×12.7 mm×1.6 mm thick. An ultrathin section was cut out of the obtained test piece using ultramicrotome, and, for the ultrathin section, ten photographs at arbitrary points magnified 500 times were observed using a Model H-7100 transmission electronic microscope manufactured by Hitachi, Ltd. Among the ten photographs, the major axis of the largest particle of the (B) flame retardant in the resin composition was determined.

(2) Transmission Electronic Microscopy (the Ratio of the Number of Particles of the (B) Flame Retardant Having a Major Axis of not More than 3 μm Relative to the Number of Particles of the Flame Retardant (B) per an Area of 1,000 μm²)

The pellet obtained was hot-air dried at 80° C. overnight and then injection molded using an injection molding machine (SG75H-MIV manufactured by Sumitomo Heavy Industries, Ltd.) at a cylinder temperature of 210° C. (Examples 1 to 30 and Comparative Examples 1 to 10) or 240° C. (Examples 31 to 47 and Comparative Examples 11 to 20) and a mold temperature of 80° C. to obtain a test piece of 127 mm×12.7 mm×1.6 mm thick. An ultrathin section was cut out of the obtained test piece using ultramicrotome, and, for the ultrathin section, ten photographs at arbitrary points magnified 500 times were observed using a Model H-7100 transmission electronic microscope manufactured by Hitachi, Ltd. For one photograph, the ratio of the number of particles of the flame retardant (B) having a major axis of not more than 3 μm relative to the number of particles of the flame retardant (B) per an area of 1,000 μm² was determined to calculate the mean value of the ten photographs.

(3) Molding Processability (Injection Molding Cycle in Injection Molding)

The pellet obtained was hot-air dried at 80° C. overnight and then injection molded using an injection molding machine (SG75H-MIV manufactured by Sumitomo Heavy Industries, Ltd.) at a cylinder temperature of 210° C. (Examples 1 to 30 and Comparative Examples 1 to 10) or 240° C. (Examples 31 to 47 and Comparative Examples 11 to 20) and a mold temperature of 80° C. For molding processability, the shortest time in which a solidified molded article with no deformation can be obtained when removing a tensile test piece that can be subjected to a tensile test from a mold was measured as an injection molding cycle. Shorter injection molding cycle means more excellent molding processability.

(4) Shock Resistance Evaluation (Notched Izod Impact Strength)

The pellet obtained was hot-air dried at 80° C. overnight and then injection molded using an injection molding machine (SG75H-MIV manufactured by Sumitomo Heavy Industries, Ltd.) at a cylinder temperature of 210° C. (Examples 1 to 30 and Comparative Examples 1 to 10) or 240° C. (Examples 31 to 47 and Comparative Examples 11 to 20) and a mold temperature of 80° C. to form a 3.2-mm-thick notched strip molded article, which was measured for Izod impact, strength according to ASTM D256.

(5) Heat Resistance Evaluation (Low Load: 0.45 MPa, Deflection Temperature Under Load in DTUL Measurement)

The pellet obtained was hot-air dried at 80° C. overnight and then injection molded using an injection molding machine (SG75H-MIV manufactured by Sumitomo Heavy Industries, Ltd.) at a cylinder temperature of 210° C. (Examples 1 to 30 and Comparative Examples 1 to 10) or 240° C. (Examples 31 to 47 and Comparative Examples 11 to 20) and a mold temperature of 80° C. to form a molded article of 12.7 mm×127 mm×3.2 mm, which was measured for deflection temperature under load (DTUL) at low load (0.45 MPa) according to ASTM D648.

(6) Flame Retardancy Evaluation (UL94 Flame Test)

The pellet obtained was hot-air dried at 80° C. overnight and then injection molded using an injection molding machine (SG75H-MIV manufactured by Sumitomo Heavy Industries, Ltd.) at a cylinder temperature of 210° C. (Examples 1 to 30 and Comparative Examples 1 to 10) or 240° C. (Examples 31 to 47 and Comparative Examples 11 to 20) and a mold temperature of 80° C. Using the formed test pieces of 127 mm×12.7 mm×1.6 mm thick and 0.8 mm thick, a flame test was carried out in accordance with the vertical flame test method of UL Standard Subject 94 (UL94) to evaluate flame retardancy. The evaluation rank is shown as V-0, V-1, V-2, and substandard in the order of excellence of flame retardancy.

The comparison between Examples 1 to 3, 5 to 6 and Comparative Examples 1 to 5 shows that the thermoplastic resin compositions, even if of the same composition, have a very excellent shock resistance, heat resistance, and flame retardancy by controlling the major axis of the largest particle of the flame retardant (B) not more than 10 μM and the ratio of the number of the particles of the flame retardant (B) having a major axis of not more than 3 μm not less than 70%.

The comparison between Examples 1 and 2 shows that the addition of a crystal nucleating agent significantly improves molding processability and heat resistance; the comparison between Example 2 and Example 3 shows that the addition of a fluorine-based resin significantly improves flame retardancy; the comparison between Example 3 and Example 4 shows that the addition of metal oxide further improves flame retardancy; the comparison between Example 4 and Example 5 shows that the addition of a plasticizer improves molding processability and heat resistance; and the comparison between Example 5 and Example 6 shows that the addition of a impact modifier greatly improves shock resistance.

The comparison between Example 6 and Example 7 shows that more excellent flame retardancy is obtained when melamine pyrophosphate and piperazine pyrophosphate are used as a flame retardant.

The comparison between Example 6 and Example 11 shows that excellent shock resistance and heat resistance are obtained by using, as a core-shell type rubber, a core-shell type rubber containing a glycidyl group(s).

The comparison between Examples 15 and 16 shows that the higher the optical purity of a polylactide resin is, the more excellent the shock resistance, heat resistance, and flame retardancy are.

The comparison between Examples 1 to 5 and Examples 18 to 22 shows that the combined use of the flame retardant (B) and the condensed phosphate ester (H) further improves flame retardancy. Further, the comparison between Examples 23 and 25 to 27 shows that excellent balance between shock resistance, heat resistance, and flame retardancy is obtained by controlling the blending ratio of the flame retardant (B) to the condensed phosphate ester (H) within a certain range.

TABLE 1

|  |  | Example 1 | Example 2 | Example 3 | Example 4 | Example 5 |
|---|---|---|---|---|---|---|
| Thermoplastic resin including polylactide resin (A) | Type | A-1-1 | A-1-1 | A-1-1 | A-1-1 | A-1-1 |
|  | parts by weight | 100 | 100 | 100 | 100 | 100 |
| Flame retardent (B) | Type | B-b | B-b | B-b | B-b | B-b |
|  | parts by weight | 40 | 40 | 40 | 40 | 40 |
| Nucleating agent (C) | Type | — | C-1 | C-1 | C-1 | C-1 |
|  | parts by weight | — | 20 | 20 | 20 | 20 |
| Fluorine-based resin (D) | Type | — | — | D-1 | D-1 | D-1 |
|  | parts by weight | — | — | 1 | 1 | 1 |
| Metal oxide (E) | Type | — | — | — | E-1 | E-1 |
|  | parts by weight | — | — | — | 2 | 2 |
| Plasticizer (F) | Type | — | — | — | — | F-1 |
|  | parts by weight | — | — | — | — | 6 |
| Impact modifier (G) | Type | — | — | — | — | — |
|  | parts by weight | — | — | — | — | — |
| Other additive | Type | — | — | — | — | — |
|  | parts by weight | — | — | — | — | — |
| Major axis of the largest particle of flame retardent (B) | μm | 9.5 | 9.2 | 9.0 | 8.5 | 8.5 |
| Ratio of major axis of flame retardent particles (B) 3 μm or less | % | 72 | 75 | 75 | 79 | 79 |
| Injection molding cycle | sec | >300 | 90 | 90 | 90 | 60 |
| Izod imapct strength | J/m | 20 | 22 | 30 | 25 | 25 |
| Deflection temperature under load (low load: 0.45 MPa) | ° C. | 60 | 105 | 113 | 115 | 118 |
| Flame resistance (UL94 1.6 mmt)) | Burning rank | V-2 | V-2 | V-0 | V-0 | V-0 |
| Flame resistance(UL94 0.8 mmt) | Burning rank | Substandard | Substandard | V-2 | V-10 | V-1 |

TABLE 2

|  |  | Example 6 | Example 7 | Example 8 | Example 9 | Example 10 | Example 11 |
|---|---|---|---|---|---|---|---|
| Thermoplastic resin including polylactide resin (A) | Type | A-1-1 | A-1-1 | A-1-1 | A-1-1 | A-1-1 | A-1-1 |
|  | parts by weight | 100 | 100 | 100 | 100 | 100 | 100 |
| Flame retardant (B) | Type | B-b | B-d | B-b | B-b | B-b | B-b |
|  | parts by weight | 50 | 50 | 50 | 50 | 50 | 50 |
| Nucleating agent (C) | Type | C-1 | C-1 | C-2 | C-3 | C-1 | C-1 |
|  | parts by weight | 20 | 20 | 2 | 20 | 20 | 20 |
| Fluorine-based resin (D) | Type | D-1 | D-1 | D-1 | D-1 | D-1 | D-1 |
|  | parts by weight | 1 | 1 | 1 | 1 | 1 | 1 |
| Metal oxide (E) | Type | E-1 | E-1 | E-1 | E-1 | E-1 | E-1 |
|  | parts by weight | 2 | 2 | 2 | 2 | 2 | 2 |
| Plasticizer (F) | Type | F-1 | F-1 | F-1 | F-1 | F-2 | F-1 |
|  | parts by weight | 6 | 6 | 6 | 6 | 6 | 6 |
| Impact modifier (G) | Type | G-1-1 | G-1-1 | G-1-1 | G-1-1 | G-1-1 | G-1-2 |
|  | parts by weight | 20 | 20 | 20 | 20 | 20 | 20 |
| Other additive | Type | — | — | — | — | — | — |
|  | parts by weight | — | — | — | — | — | — |
| Major axis of the largest particle of flame retardent (B) | μm | 8.5 | 8.8 | 8.5 | 8.8 | 8.5 | 8.5 |
| Ratio of major axis of flame retardent particles (B) 3 μm or less | % | 79 | 76 | 79 | 76 | 79 | 79 |
| Injection molding cycle | sec | 60 | 60 | 60 | 60 | 60 | 60 |
| Izod imapct strength | J/m | 80 | 75 | 78 | 75 | 72 | 70 |
| Deflection temperature under load (low load: 0.45 MPa) | ° C. | 100 | 97 | 99 | 95 | 93 | 92 |
| Flame resistance (UL94 1.6 mmt) | Burning rank | V-0 | V-1 | V-0 | V-1 | V-0 | V-0 |
| Flame resistance (UL94 0.8 mmt) | Burning rank | V-2 | V-2 | V-2 | V-2 | V-2 | V-2 |

TABLE 3

|  |  | Example 12 | Example 13 | Example 14 | Example 15 | Example 16 | Example 17 |
|---|---|---|---|---|---|---|---|
| Thermoplastic resin including polylactide resin (A) | Type | A-1-1 | A-1-1 | A-1-1 | A-1-2 | A-1-3 | A-1-1 |
|  | parts by weight | 100 | 100 | 100 | 100 | 100 | 100 |
| Flame retardent (B) | Type | B-b | B-b | B-b | B-b | B-b | B-b |
|  | parts by weight | 50 | 50 | 50 | 50 | 50 | 50 |
| Nucleating agent (C) | Type | C-1 | C-1 | C-1 | C-1 | C-1 | C-1 |
|  | parts by weight | 20 | 20 | 20 | 20 | 20 | 20 |
| Fluorine-based resin (D) | Type | D-1 | D-1 | D-1 | D-1 | D-1 | D-1 |
|  | parts by weight | 1 | 1 | 1 | 1 | 1 | 1 |
| Metal oxide (E) | Type | E-1 | E-1 | E-1 | E-1 | E-1 | E-1 |
|  | parts by weight | 2 | 2 | 2 | 2 | 2 | 2 |
| Plasticizer (F) | Type | F-1 | F-1 | F-1 | F-1 | F-1 | F-1 |
|  | parts by weight | 6 | 6 | 6 | 6 | 6 | 6 |
| Impact modifier (G) | Type | G-2 | G-3 | G4 | G-1-1 | G-1-1 | G-1-1 |
|  | parts by weight | 20 | 20 | 20 | 20 | 20 | 20 |
| Other additive | Type | — | — | — | — | — | Glass fiber |
|  | parts by weight | — | — | — | — | — | 10 |
| Major axis of the largest particle of flame retardent (B) | μm | 8.5 | 8.5 | 8.5 | 8.2 | 8.5 | 8.5 |
| Ratio of major axis of flame retardent particles (B) 3 μm or less | % | 79 | 79 | 79 | 82 | 79 | 79 |
| Injection molding cycle | sec | 60 | 60 | 60 | 60 | 60 | 60 |
| Izod imapct strength | J/m | 67 | 65 | 65 | 90 | 83 | 75 |
| Deflection temperature under load (low load: 0.45 MPa) | ° C. | 92 | 90 | 90 | 108 | 103 | 120 |
| Flame resistance (UL94 1.6 mmt) | Burning rank | V-0 | V-0 | V-0 | V-0 | V-1 | V-0 |
| Flame resistance (UL94 0.8 mmt) | Burning rank | V-2 | V-2 | V-2 | V-2 | V-2 | V-1 |

TABLE 4

|  |  | Example 18 | Example 19 | Example 20 | Example 21 | Example 22 |
|---|---|---|---|---|---|---|
| Thermoplastic resin including polylactide resin (A) | Type | A-1-1 | A-1-1 | A-1-1 | A-1-1 | A-1-1 |
|  | parts by weight | 100 | 100 | 100 | 100 | 100 |
| Flame retardent (B) | Type | B-b | B-b | B-b | B-b | B-b |
|  | parts by weight | 40 | 40 | 40 | 40 | 40 |
| Condensed phosphate ester (H) | Type | H-1 | H-1 | H-1 | H-1 | H-1 |
|  | parts by weight | 10 | 10 | 10 | 10 | 10 |
| Nucleating agent (C) | Type | — | C-1 | C-1 | C-1 | C-1 |
|  | parts by weight | — | 20 | 20 | 20 | 20 |
| Fluorine-based resin (D) | Type | — | — | D-1 | D-1 | D-1 |
|  | parts by weight | — | — | 1 | 1 | 1 |
| Metal oxide (E) | Type | — | — | — | E-1 | E-1 |
|  | parts by weight | — | — | — | 2 | 2 |
| Plasticizer (F) | Type | — | — | — | — | F-1 |
|  | parts by weight | — | — | — | — | 6 |
| Impact modifier (G) | Type | — | — | — | — | — |
|  | parts by weight | — | — | — | — | — |
| Other additive | Type | — | — | — | — | — |
|  | parts by weight | — | — | — | — | — |
| Major axis of the largest particle of flame retardent (B) | μm | 9.2 | 9.0 | 8.5 | 8.2 | 8.2 |
| Ratio of major axis of flame retardent particles (B) 3 μm or less | % | 75 | 75 | 79 | 82 | 82 |
| Blend ratio of flame retardent (B)/condensed phosphate ester (H) |  | 80/20 | 80/20 | 80/20 | 80/20 | 80/20 |
| Injection molding cycle | sec | >300 | 90 | 90 | 90 | 60 |
| Izod imapct strength | J/m | 21 | 24 | 33 | 28 | 28 |
| Deflection temperature under load (low load: 0.45 MPa) | ° C. | 62 | 107 | 115 | 118 | 121 |
| Flame resistance (UL94 1.6 mmt) | Burning rank | V-1 | V-1 | V-0 | V-0 | V-0 |
| Flame resistance (UL94 0.8 mmt) | Burning rank | V-2 | V-2 | V-1 | V-0 | V-0 |

TABLE 5

|  |  | Example 23 | Example 24 | Example 25 | Example 26 | Example 27 |
|---|---|---|---|---|---|---|
| Thermoplastic resin including polylactide resin (A) | Type | A-1-1 | A-1-1 | A-1-1 | A-1-1 | A-1-1 |
|  | parts by weight | 100 | 100 | 100 | 100 | 100 |
| Flame retardent (B) | Type | T | B-b | B-b | B-b | B-b |
|  | parts by weight | 40 | 40 | 50 | 50 | 40 |
| Condensed phosphate ester (H) | Type | H-1 | H-2 | H-1 | H-1 | H-1 |
|  | parts by weight | 10 | 10 | 10 | 5 | 30 |

TABLE 5-continued

|  |  | Example 23 | Example 24 | Example 25 | Example 26 | Example 27 |
|---|---|---|---|---|---|---|
| Nucleating agent (C) | Type | C-1 | C-1 | C-1 | C-1 | C-1 |
|  | parts by weight | 20 | 20 | 20 | 20 | 20 |
| Fluorine-based resin (D) | Type | D-1 | D-1 | D-1 | D-1 | D-1 |
|  | parts by weight | 1 | 1 | 1 | 1 | 1 |
| Metal oxide (E) | Type | E-1 | E-1 | E-1 | E-1 | E-1 |
|  | parts by weight | 2 | 2 | 2 | 2 | 2 |
| Plasticizer (F) | Type | F-1 | F-1 | F-1 | F-1 | F-1 |
|  | parts by weight | 6 | 6 | 6 | 6 | 6 |
| Impact modifier (G) | Type | G-1-1 | G-1-1 | G-1-1 | G-1-1 | G-1-1 |
|  | parts by weight | 20 | 20 | 20 | 20 | 20 |
| Other additive | Type | — | — | — | — | — |
|  | parts by weight | — | — | — | — | — |
| Major axis of the largest particle of flame retardent (B) | μm | 8.2 | 8.2 | 8.5 | 8.5 | 8.5 |
| Ratio of major axis of flame retardent particles (B) 3 μm or less | % | 82 | 82 | 80 | 78 | 80 |
| Blend ratio of flame retardent (B)/condensed phosphate ester (H) |  | 80/20 | 80/20 | 83/17 | 91/9 | 57/43 |
| Injection molding cycle | sec | 60 | 60 | 60 | 60 | 60 |
| Izod imapct strength | J/m | 85 | 83 | 86 | 80 | 75 |
| Deflection temperature under load (low load: 0.45 MPa) | ° C. | 103 | 103 | 105 | 100 | 90 |
| Flame resistance (UL94 1.6 mmt) | Burning rank | V-0 | V-0 | V-0 | V-0 | V-2 |
| Flame resistance (UL94 0.8 mmt) | Burning rank | V-1 | V-1 | V-1 | V-2 | V-2 |

TABLE 6

|  |  | Example 28 | Example 29 | Example 30 |
|---|---|---|---|---|
| Thermoplastic resin including polylactide resin (A) | Type | A-1-2 | A-1-3 | A-1-1 |
|  | parts by weight | 100 | 100 | 100 |
| Flame retardent (B) | Type | B-b | B-b | B-b |
|  | parts by weight | 50 | 50 | 50 |
| Condensed phosphate ester (H) | Type | H-1 | H-1 | H-1 |
|  | parts by weight | 10 | 10 | 10 |
| Nucleating agent (C) | Type | C-1 | C-1 | C-1 |
|  | parts by weight | 20 | 20 | 20 |
| Fluorine-based resin (D) | Type | D-1 | D-1 | D-1 |
|  | parts by weight | 1 | 1 | 1 |
| Metal oxide (E) | Type | E-1 | E-1 | E-1 |
|  | parts by weight | 2 | 2 | 2 |
| Plasticizer (F) | Type | F-1 | F-1 | F-1 |
|  | parts by weight | 6 | 6 | 6 |
| Impact modifier (G) | Type | G-1-1 | G-1-1 | G-1-1 |
|  | parts by weight | 20 | 20 | 20 |
| Other additive | Type | — | — | Glass fiber |
|  | parts by weight | — | — | 10 |
| Major axis of the largest particle of flame retardent (B) | μm | 8.2 | 8.5 | 8.5 |
| Ratio of major axis of flame retardent particles (B) 3 μm or less | % | 80 | 78 | 80 |
| Blend ratio of flame retardent (B)/condensed phosphate ester (H) |  | 83/17 | 83/17 | 83/17 |
| Injection molding cycle | sec | 60 | 60 | 60 |
| Izod imapct strength | J/m | 93 | 88 | 77 |
| Deflection temperature under load (low load: 0.45 MPa) | ° C. | 112 | 105 | 123 |
| Flame resistance (UL94 1.6 mmt) | Burning rank | V-0 | V-1 | V-0 |
| Flame resistance (UL94 0.8 mmt) | Burning rank | V-1 | V-1 | V-0 |

TABLE 7

|  |  | Comparative Example 1 | Comparative Example 2 | Comparative Example 3 | Comparative Example 4 | Comparative Example 5 |
|---|---|---|---|---|---|---|
| Thermoplastic resin including polylactide resin (A) | Type | A-1-1 | A-1-1 | A-1-1 | A-1-1 | A-1-1 |
|  | parts by weight | 100 | 100 | 100 | 100 | 100 |
| Flame retardent (B) | Type | B-a | B-a | B-a | B-a | B-a |
|  | parts by weight | 40 | 40 | 40 | 40 | 50 |
| Nucleating agent (C) | Type | — | C-1 | C-1 | C-1 | C-1 |
|  | parts by weight | — | 20 | 20 | 20 | 20 |
| Fluorine-based resin (D) | Type | — | — | D-1 | D-1 | D-1 |
|  | parts by weight | — | — | 1 | 1 | 1 |

TABLE 7-continued

|  |  | Comparative Example 1 | Comparative Example 2 | Comparative Example 3 | Comparative Example 4 | Comparative Example 5 |
|---|---|---|---|---|---|---|
| Metal oxide (E) | Type | — | — | — | E-1 | E-1 |
|  | parts by weight | — | — | — | 2 | 2 |
| Plasticizer (F) | Type | — | — | — | F-1 | F-1 |
|  | parts by weight | — | — | — | 6 | 6 |
| Impact modifier (G) | Type | — | — | — | — | G-1-1 |
|  | parts by weight | — | — | — | — | 20 |
| Major axis of the largest particle of flame retardent (B) | μm | 22.5 | 21.5 | 21.0 | 21.0 | 20.8 |
| Ratio of major axis of flame retardent particles (B) 3 μm or less | % | 48 | 50 | 52 | 52 | 50 |
| Injection molding cycle | sec | >300 | 90 | 90 | 60 | 60 |
| Izod imapct strength | J/m | 15 | 18 | 22 | 20 | 65 |
| Deflection temperature under load (low load: 0.45 MPa) | °C. | 52 | 88 | 103 | 108 | 88 |
| Flame resistance (UL94 1.6 mmt) | Burning rank | Substandard | Substandard | Substandard | Substandard | Substandard |
| Flame resistance (UL94 0.8 mmt) | Burning rank | Substandard | Substandard | Substandard | Substandard | Substandard |

TABLE 8

|  |  | Comparative Example 6 | Comparative Example 7 | Comparative Example 8 | Comparative Example 9 | Comparative Example 10 |
|---|---|---|---|---|---|---|
| Thermoplastic resin including polylactide resin (A) | Type | A-1-1 | A-1-1 | A-1-1 | A-1-1 | A-1-1 |
|  | parts by weight | 100 | 100 | 100 | 100 | 100 |
| Flame retardent (B) | Type | B-a | B-a | B-a | B-a | B-a |
|  | parts by weight | 40 | 40 | 40 | 40 | 50 |
| Condensed phosphate ester (H) | Type | H-1 | H-1 | H-1 | H-1 | H-1 |
|  | parts by weight | 10 | 10 | 10 | 10 | 10 |
| Nucleating agent (C) | Type | — | C-1 | C-1 | C-1 | C-1 |
|  | parts by weight | — | 20 | 20 | 20 | 20 |
| Fluorine-based resin (D) | Type | — | — | D-1 | D-1 | D-1 |
|  | parts by weight | — | — | 1 | 1 | 1 |
| Metal oxide (E) | Type | — | — | — | E-1 | E-1 |
|  | parts by weight | — | — | — | 2 | 2 |
| Plasticizer (F) | Type | — | — | — | F-1 | F-1 |
|  | parts by weight | — | — | — | 6 | 6 |
| Impact modifier (G) | Type | — | — | — | — | G-1-1 |
|  | parts by weight | — | — | — | — | 20 |
| Major axis of the largest particle of flame retardent (B) | μm | 22.0 | 21.2 | 20.5 | 20.5 | 20.0 |
| Ratio of major axis of flame retardent particles (B) 3 μm or less | % | 50 | 52 | 53 | 50 | 55 |
| Blend ratio of flame retardent (B)/condensed phosphate ester (H) |  | 80/20 | 80/20 | 80/20 | 80/20 | 83/17 |
| Injection molding cycle | sec | >300 | 90 | 90 | 60 | 60 |
| Izod imapct strength | J/m | 16 | 20 | 25 | 25 | 70 |
| Deflection temperature under load (low load: 0.45 MPa) | °C. | 54 | 90 | 106 | 110 | 92 |
| Flame resistance (UL94 1.6 mmt) | Burning rank | Substandard | Substandard | V-2 | V-2 | V-2 |
| Flame resistance (UL94 0.8 mmt) | Burning rank | Substandard | Substandard | Substandard | Substandard | Substandard |

TABLE 9

|  |  | Example 31 | Example 32 | Example 33 | Example 34 | Example 35 |
|---|---|---|---|---|---|---|
| Thermoplastic resin including polylactide resin (A) | Type | A-1-1 | A-1-1 | A-1-1 | A-1-1 | A-1-1 |
|  | wt % | 80 | 80 | 80 | 80 | 80 |
|  | Type | A-2 | A-2 | A-2 | A-2 | A-2 |
|  | wt % | 20 | 20 | 20 | 20 | 20 |
|  | parts by weight | 100 | 100 | 100 | 100 | 100 |
| Flame retardent (B) | Type | B-b | B-b | B-b | B-b | B-b |
|  | parts by weight | 40 | 40 | 40 | 40 | 50 |
| Nucleating agent (C) | Type | — | C-1 | C-1 | C-1 | C-1 |
|  | parts by weight | — | 15 | 15 | 15 | 15 |
| Fluorine-based resin (D) | Type | — | D-1 | D-1 | D-1 | D-1 |
|  | parts by weight | — | 1 | 1 | 1 | 1 |
| Metal oxide (E) | Type | — | — | E-1 | E-1 | E-1 |
|  | parts by weight | — | — | 2 | 2 | 2 |
| Impact modifier (G) | Type | — | — | — | — | G-1-1 |
|  | parts by weight | — | — | — | — | 20 |
| Compatibilizing agent (I) | Type | — | — | — | I-1 | — |
|  | parts by weight | — | — | — | 5 | — |

TABLE 9-continued

|  |  | Example 31 | Example 32 | Example 33 | Example 34 | Example 35 |
|---|---|---|---|---|---|---|
| Major axis of the largest particle of flame retardent (B) | μm | 8.5 | 8.0 | 7.6 | 7.6 | 7.6 |
| Ratio of major axis of flame retardent particles (B) 3 μm or less | % | 80 | 83 | 85 | 84 | 85 |
| Injection molding cycle | sec | 240 | 60 | 60 | 50 | 50 |
| Izod imapct strength | J/m | 30 | 50 | 45 | 70 | 85 |
| Deflection temperature under load (low load: 0.45 MPa) | °C. | 65 | 115 | 118 | 125 | 108 |
| Flame resistance (UL94 1.6 mmt) | Burning rank | V-2 | V-0 | V-0 | V-0 | V-0 |
| Flame resistance (UL94 0.8 mmt) | Burning rank | Substandard | V-2 | V-1 | V-1 | V-2 |

TABLE 10

|  |  | Example 36 | Example 37 | Example 38 | Example 39 |
|---|---|---|---|---|---|
| Thermoplastic resin including polylactide resin (A) | Type | A-1-1 | A-1-1 | A-1-1 | A-1-1 |
|  | wt % | 40 | 40 | 40 | 40 |
|  | Type | A-2 | A-2 | A-2 | A-2 |
|  | wt % | 60 | 60 | 60 | 60 |
|  | parts by weight | 100 | 100 | 100 | 100 |
| Flame retardent (B) | Type | B-b | B-b | B-b | B-b |
|  | parts by weight | 40 | 40 | 40 | 50 |
| Nucleating agent (C) | Type | — | C-1 | C-1 | C-1 |
|  | parts by weight | — | 15 | 15 | 15 |
| Fluorine-based resin (D) | Type | — | D-1 | D-1 | D-1 |
|  | parts by weight | — | 1 | 1 | 1 |
| Metal oxide (E) | Type | — | E-1 | E-1 | E-1 |
|  | parts by weight | — | 2 | 2 | 2 |
| Impact modifier (G) | Type | — | — | — | G-1-1 |
|  | parts by weight | — | — | — | 20 |
| Compatibilizing agent (I) | Type | — | — | I-1 | — |
|  | parts by weight | — | — | 5 | — |
| Major axis of the largest particle of flame retardent (B) | μm | 8.2 | 7.4 | 7.4 | 7.4 |
| Ratio of major axis of flame retardent particles (B) 3 μm or less | % | 78 | 86 | 85 | 85 |
| Injection molding cycle | sec | 90 | 40 | 35 | 35 |
| Izod imapct strength | J/m | 48 | 60 | 84 | 100 |
| Deflection temperature under load (low load: 0.45 MPa) | °C. | 80 | 124 | 129 | 115 |
| Flame resistance (UL94 1.6 mmt) | Burning rank | V-2 | V-0 | V-0 | V-0 |
| Flame resistance (UL94 0.8 mmt) | Burning rank | Substandard | V-1 | V-1 | V-2 |

TABLE 11

|  |  | Example 40 | Example 41 | Example 42 | Example 43 | Example 44 |
|---|---|---|---|---|---|---|
| Thermoplastic resin including polylactide resin (A) | Type | A-1-1 | A-1-1 | A-1-1 | A-1-1 | A-1-1 |
|  | wt % | 80 | 80 | 80 | 80 | 80 |
|  | Type | A-2 | A-2 | A-2 | A-2 | A-2 |
|  | wt % | 20 | 20 | 20 | 20 | 20 |
|  | parts by weight | 100 | 100 | 100 | 100 | 100 |
| Flame retardent (B) | Type | B-b | B-b | B-b | B-b | B-b |
|  | parts by weight | 40 | 40 | 40 | 40 | 50 |
| Condensed phosphate ester (H) | Type | H-1 | H-1 | H-1 | H-1 | H-1 |
|  | parts by weight | 10 | 10 | 10 | 10 | 10 |
| Nucleating agent (C) | Type | — | C-1 | C-1 | C-1 | C-1 |
|  | parts by weight | — | 15 | 15 | 15 | 15 |
| Fluorine-based resin (D) | Type | — | D-1 | D-1 | D-1 | D-1 |
|  | parts by weight | — | 1 | 1 | 1 | 1 |
| Metal oxide (E) | Type | — | — | E-1 | E-1 | E-1 |
|  | parts by weight | — | — | 2 | 2 | 2 |
| Impact modifier (G) | Type | — | — | — | — | G-1-1 |
|  | parts by weight | — | — | — | — | 20 |
| Compatibilizing agent (I) | Type | — | — | — | I-1 | — |
|  | parts by weight | — | — | — | 5 | — |
| Major axis of the largest particle of flame retardent (B) | μm | 8.2 | 7.8 | 7.4 | 7.4 | 7.2 |
| Ratio of major axis of flame retardent particles (B) 3 μm or less | % | 78 | 85 | 86 | 86 | 88 |
| Blend ratio of flame retardent (B)/condensed phosphate ester (H) |  | 80/20 | 80/20 | 80/20 | 80/20 | 83/17 |
| Injection molding cycle | sec | 240 | 60 | 60 | 50 | 50 |

TABLE 11-continued

|  |  | Example 40 | Example 41 | Example 42 | Example 43 | Example 44 |
|---|---|---|---|---|---|---|
| Izod imapct strength | J/m | 32 | 52 | 46 | 72 | 87 |
| Deflection temperature under load (low load: 0.45 MPa) | ° C. | 67 | 118 | 120 | 128 | 110 |
| Flame resistance (UL94 1.6 mmt) | Burning rank | V-1 | V-0 | V-0 | V-0 | V-0 |
| Flame resistance (UL94 0.8 mmt) | Burning rank | V-2 | V-1 | V-0 | V-0 | V-1 |

TABLE 12

|  |  | Example 45 | Example 46 | Example 47 |
|---|---|---|---|---|
| Thermoplastic resin including polylactide resin (A) | Type | A-1-1 | A-1-1 | A-1-1 |
|  | wt % | 40 | 40 | 40 |
|  | Type | A-2 | A-2 | A-2 |
|  | wt % | 60 | 60 | 60 |
|  | parts by weight | 100 | 100 | 100 |
| Flame retardent (B) | Type | B-b | B-b | B-b |
|  | parts by weight | 40 | 40 | 50 |
| Condensed phosphate ester (H) | Type | H-1 | H-1 | H-1 |
|  | parts by weight | 10 | 10 | 10 |
| Nucleating agent (C) | Type | — | C-1 | C-1 |
|  | parts by weight | — | 15 | 15 |
| Fluorine-based resin (D) | Type | — | D-1 | D-1 |
|  | parts by weight | — | 1 | 1 |
| Metal oxide (E) | Type | — | E-1 | E-1 |
|  | parts by weight | — | 2 | 2 |
| Impact modifier (G) | Type | — | — | G-1-1 |
|  | parts by weight | — | — | 20 |
| Compatibilizing agent (I) | Type | — | I-1 | — |
|  | parts by weight | — | 5 | — |
| Major axis of the largest particle of flame retardent (B) | μm | 8.0 | 7.2 | 7.2 |
| Ratio of major axis of flame retardent particles (B) 3 μm or less | % | 82 | 86 | 88 |
| Blend ratio of flame retardent (B)/condensed phosphate ester (H) |  | 80/20 | 80/20 | 83/17 |
| Injection molding cycle | sec | 90 | 35 | 35 |
| Izod imapct strength | J/m | 50 | 86 | 102 |
| Deflection temperature under load (low load: 0.45 MPa) | ° C. | 81 | 130 | 118 |
| Flame resistance (UL94 1.6 mmt) | Burning rank | V-1 | V-0 | V-0 |
| Flame resistance (UL94 0.8 mmt) | Burning rank | V-2 | V-0 | V-1 |

TABLE 13

|  |  | Comparative Example 11 | Comparative Example 12 | Comparative Example 13 | Comparative Example 14 | Comparative Example 15 |
|---|---|---|---|---|---|---|
| Thermoplastic resin including polylactide resin (A) | Type | A-1-1 | A-1-1 | A-1-1 | A-1-1 | A-1-1 |
|  | wt % | 80 | 80 | 80 | 80 | 80 |
|  | Type | A-2 | A-2 | A-2 | A-2 | A-2 |
|  | wt % | 20 | 20 | 20 | 20 | 20 |
|  | parts by weight | 100 | 100 | 100 | 100 | 100 |
| Flame retardent (B) | Type | B-a | B-a | B-a | B-a | B-a |
|  | parts by weight | 40 | 40 | 40 | 40 | 50 |
| Nucleating agent (C) | Type | — | C-1 | C-1 | C-1 | C-1 |
|  | parts by weight | — | 15 | 15 | 15 | 15 |
| Fluorine-based resin (D) | Type | — | D-1 | D-1 | D-1 | D-1 |
|  | parts by weight | — | 1 | 1 | 1 | 1 |
| Metal oxide(E) | Type | — | — | E-1 | E-1 | E-1 |
|  | parts by weight | — | — | 2 | 2 | 2 |
| Impact modifier(G) | Type | — | — | — | — | G-1-1 |
|  | parts by weight | — | — | — | — | 20 |
| Compatibilizing agent(I) | Type | — | — | — | I-1 | — |
|  | parts by weight | — | — | — | 5 | — |
| Major axis of the largest particle of flame retardent (B) | μm | 21.5 | 20.8 | 20.5 | 20.2 | 20.5 |
| Ratio of major axis of flame retardent particles (B) 3 μm or less | % | 52 | 53 | 52 | 54 | 53 |
| Injection molding cycle | sec | 240 | 60 | 60 | 50 | 50 |
| Izod imapct strength | J/m | 25 | 43 | 38 | 62 | 78 |

TABLE 13-continued

|  |  | Comparative Example 11 | Comparative Example 12 | Comparative Example 13 | Comparative Example 14 | Comparative Example 15 |
|---|---|---|---|---|---|---|
| Deflection temperature under load (low load: 0.45 MPa) | °C. | 58 | 105 | 109 | 112 | 97 |
| Flame resistance (UL94 1.6 mm) | Burning rank | Substandard | Substandard | Substandard | Substandard | Substandard |
| Flame resistance (UL94 0.8 mmt) | Burning rank | Substandard | Substandard | Substandard | Substandard | Substandard |

TABLE 14

|  |  | Comparative Example 16 | Comparative Example 17 | Comparative Example 18 | Comparative Example 19 | Comparative Example 20 |
|---|---|---|---|---|---|---|
| Thermoplastic resin including polylactide resin (A) | Type | A-1-1 | A-1-1 | A-1-1 | A-1-1 | A-1-1 |
|  | wt % | 80 | 80 | 80 | 80 | 80 |
|  | Type | A-2 | A-2 | A-2 | A-2 | A-2 |
|  | wt % | 20 | 20 | 20 | 20 | 20 |
|  | parts by weight | 100 | 100 | 100 | 100 | 100 |
| Flame retardent (B) | Type | B-a | B-a | B-a | B-a | B-a |
|  | parts by weight | 40 | 40 | 40 | 40 | 50 |
| Condensed phosphate ester (H) | Type | H-1 | H-1 | H-1 | H-1 | H-1 |
|  | parts by weight | 10 | 10 | 10 | 10 | 10 |
| Nucleating agent (C) | Type | — | C-1 | C-1 | C-1 | C-1 |
|  | parts by weight | — | 15 | 15 | 15 | 15 |
| Fluorine-based resin (D) | Type | — | D-1 | D-1 | D-1 | D-1 |
|  | parts by weight | — | 1 | 1 | 1 | 1 |
| Metal oxide (E) | Type | — | — | E-1 | E-1 | E-1 |
|  | parts by weight | — | — | 2 | 2 | 2 |
| Impact modifier (G) | Type | — | — | — | — | G-1-1 |
|  | parts by weight | — | — | — | — | 20 |
| Compatibilizing agent (I) | Type | — | — | — | I-1 | — |
|  | parts by weight | — | — | — | 5 | — |
| Major axis of the largest particle of flame retardant (B) | μm | 21.2 | 20.5 | 20.8 | 20.3 | 20.3 |
| Ratio of major axis of flame retardent particles (B) 3 μm less | % | 51 | 54 | 52 | 55 | 54 |
| Blend ratio of flame retardent (B)/condensed phosphate ester (H) |  | 80/20 | 80/20 | 80/20 | 80/20 | 83/17 |
| Injection molding cycle | sec | 240 | 60 | 60 | 50 | 50 |
| Izod imapct strength | J/m | 27 | 45 | 40 | 64 | 80 |
| Deflection temperature under load (low load: 0.45 MPa) | °C. | 60 | 108 | 111 | 115 | 99 |
| Flame resistance (UL94 1.6 mmt) | Burning rank | Substandard | V-2 | V-2 | V-2 | V-2 |
| Flame resistance (UL94 0.8 mmt) | Burning rank | Substandard | Substandard | Substandard | Substandard | Substandard |

The invention claimed is:

1. A thermoplastic resin composition comprising 1 to 100 parts by weight of a flame retardant (B) containing any one or more flame retardants (B-1) selected from melamine phosphate, melamine pyrophosphate, and melamine polyphosphate and any one or more flame retardants (B-2) selected from piperazine phosphate, piperazine pyrophosphate, and piperazine polyphosphate, based on 100 parts by weight of a thermoplastic resin (A) comprising polylactide resin, wherein, according to transmission electronic microscopy, the major axis of the largest particle of the flame retardant (B) in the resin composition is not more than 10 μm, and the ratio of the number of particles of the flame retardant (B) having a major axis of not more than 3 μm relative to the number of particles of the flame retardant (B) per an area of 1,000 μm$^2$ is 70% or more.

2. The thermoplastic resin composition according to claim 1, further comprising 1 to 50 parts by weight of a condensed phosphate ester (H) based on 100 parts by weight of the thermoplastic resin comprising polylactide resin (A).

3. The thermoplastic resin composition according to claim 2, wherein the blending ratio of the flame retardant (B) to the condensed phosphate ester (H) (the ratio of the flame retardant (B)/the condensed phosphate ester (H)) is 90/10 to 60/40 in weight ratio.

4. The thermoplastic resin composition according to claim 1, further comprising 0.01 to 50 parts by weight of a crystal nucleating agent (C) based on 100 parts by weight of the thermoplastic resin comprising polylactide resin (A).

5. The thermoplastic resin composition according to claim 1, further comprising 0.01 to 10 parts by weight of a fluorine-based resin (D) based on 100 parts by weight of the thermoplastic resin comprising polylactide resin (A).

6. The thermoplastic resin composition according to claim 1, further comprising 0.01 to 10 parts by weight of a metal oxide (E) based on 100 parts by weight of the thermoplastic resin comprising polylactide resin (A).

7. The thermoplastic resin composition according to claim 1, further comprising 0.1 to 50 parts by weight of a plasticizer (F) based on 100 parts by weight of the thermoplastic resin comprising polylactide resin (A).

8. The thermoplastic resin composition according to claim 1, further comprising 0.1 to 50 parts by weight of an impact modifier (G) based on 100 parts by weight of the thermoplastic resin comprising polylactide resin (A).

9. The thermoplastic resin composition according to claim 1, wherein the thermoplastic resin comprising polylactide resin (A) comprises 1 to 99% by weight of a polylactide resin (A-1) and 99 to 1% by weight of a thermoplastic resin other than polylactide resin (A-2).

10. The thermoplastic resin composition according to claim 9, wherein the thermoplastic resin other than polylactide resin (A-2) is a polycarbonate resin.

11. The thermoplastic resin composition according to claim 1, wherein the flame retardant (B-1) is melamine pyrophosphate.

12. The thermoplastic resin composition according to claim 1, wherein the flame retardant (B-2) is piperazine pyrophosphate.

13. The thermoplastic resin composition according to claim 8, wherein the impact modifier (G) is a core-shell type rubber (G-1).

14. The thermoplastic resin composition according to claim 13, wherein the core-shell type rubber (G-1) contains a glycidyl group(s).

15. A molded article obtained by molding the thermoplastic resin composition according to claim 1.

* * * * *